(12) United States Patent
Agarwal et al.

(10) Patent No.: US 11,418,022 B2
(45) Date of Patent: Aug. 16, 2022

(54) ACTIVE INRUSH CURRENT LIMITER

(71) Applicant: SL Power Electronics Corporation, Ventura, CA (US)

(72) Inventors: Nitish Agarwal, Ventura, CA (US); Randall M. Wagner, Thousand Oaks, CA (US); William Mallory, Santa Rosa Valley, CA (US)

(73) Assignee: SL Power Electronics Corporation, Ventura, CA (US)

( * ) Notice: Subject to any disclaimer, the term of this patent is extended or adjusted under 35 U.S.C. 154(b) by 12 days.

(21) Appl. No.: 17/159,321

(22) Filed: Jan. 27, 2021

(65) Prior Publication Data

US 2022/0037877 A1 Feb. 3, 2022

Related U.S. Application Data

(60) Provisional application No. 63/058,090, filed on Jul. 29, 2020.

(51) Int. Cl.
*H02H 9/00* (2006.01)
*H01C 7/04* (2006.01)

(52) U.S. Cl.
CPC ............... *H02H 9/001* (2013.01); *H01C 7/04* (2013.01)

(58) Field of Classification Search
CPC .................. H02H 9/001; H01C 7/04
See application file for complete search history.

(56) References Cited

U.S. PATENT DOCUMENTS

| 5,638,264 A | 6/1997 | Hayashi et al. |
| 7,408,755 B1 | 8/2008 | Ye et al. |
| 7,843,706 B2 | 11/2010 | Suzuki et al. |
| 8,305,783 B2 | 11/2012 | Rizzo |

(Continued)

FOREIGN PATENT DOCUMENTS

| DE | 102006014297 A1 * | 10/2007 | ............. H02H 9/001 |
| EP | 3421287 A1 | 1/2019 | |

OTHER PUBLICATIONS

Translation of DE 10 2006 014 297 A1. Oct. 18, 2007. (Year: 2007).*

(Continued)

*Primary Examiner* — Jared Fureman
*Assistant Examiner* — Christopher J Clark
(74) *Attorney, Agent, or Firm* — Alix, Yale & Ristas, LLP

(57) ABSTRACT

An active inrush current limiter and method of limiting inrush current actively monitor line voltage and voltage drop across a current limiting resistance in a manner that eliminates the impact of fluctuations of line voltage on the decision of when to close a relay and bypass a current limiting resistance between the AC source and a group of power supplies. The active inrush current limiter includes a microcontroller connected to control the electronic switch and relay. The microcontroller is configured to sample the source AC power and detect a pattern of current flow through the electronic switch and current limiting resistance. A program executed in the microcontroller includes calculations that determine when to close the relay and bypass the current limiting resistance by detecting changes in power flow through the current limiting resistance that reliably correspond to a time when the capacitors in the power supplies have completed charging.

19 Claims, 21 Drawing Sheets

(56) References Cited

U.S. PATENT DOCUMENTS

| | | |
|---|---|---|
| 8,542,506 B2 | 9/2013 | Schluter et al. |
| 9,065,266 B2 | 6/2015 | Divan |
| 9,124,093 B2 | 9/2015 | Jones et al. |
| 9,537,351 B2 | 1/2017 | Lee et al. |
| 10,270,331 B2 | 4/2019 | Andoh |
| 10,615,593 B2 | 4/2020 | Langer |
| 2003/0107859 A1 | 6/2003 | Pan et al. |
| 2006/0274468 A1 | 12/2006 | Phadke |
| 2011/0205674 A1* | 8/2011 | Divan ............... H02H 3/207 323/304 |
| 2014/0268458 A1* | 9/2014 | Luciani ............... H02H 3/10 361/87 |
| 2015/0016005 A1 | 1/2015 | Simonson et al. |
| 2015/0155732 A1 | 6/2015 | McCormick |
| 2020/0045794 A1 | 2/2020 | Reed et al. |

OTHER PUBLICATIONS

PCT International Search Report and Written Opinion for International application No. PCT/US2021/015210 filed Jan. 27, 2021; dated May 14, 2021; 12 pgs.

"ESB303 230/400Vac 16A Inrush Current Limiter for N-wire-networks for capacitive loads, 3x230/400Vac 16A, 16 ⅓ Hz-440Hz, -40° C. . . . +60° C."; CAMTEC Power Supplies GmbH; p. 1/6 (10.2019-01-0); 6 p.

"LED Driver Inrush Currents"; Copyright © 2020 Advanced Lighting Technologies Australia Inc.; 4 Pgs.

"Irush Current Protection for LED Lighting Retrofits"; Blog (https://www.ametherm.com/blog/) » Inrush Current Protection for LED Lighting Retrofits; (https://www.ametherm.com/); © 1998-2013 Ametherm, Inc; 6 pgs.

\* cited by examiner

ACTIVE INRUSH CURRENT LIMITER

BACKGROUND

Inrush current occurs when a system powers on and experiences a brief and substantially higher than normal input current. If not effectively managed, inrush current can stress electrical components, reduce the operating life or destroy equipment. Inrush current may also trip circuit breakers, blow fuses, or damage relay and line switch contacts.

Most electrical equipment requires direct current (DC) power to operate. Power supplies convert alternating current (AC) line power to DC power for use in equipment such as computer systems and LED lighting. Every power supply has a capacitor for filtering and energy storage. When equipment with a power supply is first turned on the capacitor is empty and appears like a short at its input, drawing an exceptionally large amount of current from the AC source. As the AC line voltage increases after a zero crossing, the current drawn by the power supply increases proportionately.

It is known to construct power supplies with an inrush current limiter in the form of a resistance in series with the capacitor. When the capacitor is charged, the resistance is bypassed using a relay. This solution may be sufficient for a single power supply, but when more than one power supply is connected to the same AC source, the equivalent resistance of the connected power supplies decreases, while the combined capacitance increases, resulting in a large inrush current.

LED lighting is now standard in most new construction and is being retrofitted into existing facilities. Each LED luminaire includes a power supply and many luminaires may be required to illuminate a given area. This means a number of power supplies are connected to a circuit and are turned on at the same time, resulting in large inrush currents that cannot be managed by the inrush current limiting built in to the LED luminaire power supplies. One solution is to reduce the number of LED luminaires connected to a given circuit breaker, which increases the number of circuits and the cost of the installed lighting system.

Another solution is to place a current limiting module between the AC source, ON/OFF switching device and the power supplies of the LED luminaires. Existing current limiting modules may employ a negative temperature coefficient (NTC) resistor, whose resistance is initially high when the system is first turned on and the resistor is cool but decreases as the inrush current heats the NTC resistor. This solution does not work well when the NTC resistor is already warm, or in high ambient temperatures. Even when heated and relatively low resistance, the NTC resistor remains in the circuit and consumes power. Other current limiting modules place a current limiting resistance in line with the load and employ a timer to actuate a relay to bypass the resistance. Variability in components of each power supply produce inrush currents of different duration, so there is no pre-determined fixed time when the inrush current for all the power supplies has ended.

There is a need in the art for a method of limiting inrush current to a network of connected power supplies that is not necessarily based upon a fixed time, is not sensitive to fluctuations in the voltage or frequency of source power, and bypasses any current limiting resistance to maximize efficiency.

SUMMARY OF THE INVENTION

The disclosed active inrush current limiter and method of limiting inrush current improve over the prior art by actively monitoring line voltage and voltage drop across the current limiting resistance in a manner that eliminates the impact of fluctuations of line voltage on the decision of when to close a relay and bypass a current limiting resistance between the AC source and the downstream group of power supplies associated with a group of electrical appliances such as computer servers or LED luminaires. According to aspects of the disclosure, upon meeting one of several conditions, the active inrush current limiter is programmed to close the relay and bypass the current limiting resistance.

An active inrush current limiter according to aspects of the disclosure may take the form of an inrush current limiting module connected between a source of AC power and a group of power supplies. The current limiting module suppresses inrush current to the group of power supplies by initially connecting the AC power to the group of power supplies through an electronic switch and current limiting resistance. The current limiting module includes a relay in parallel with the electronic switch and current limiting resistance, where closure of the relay contacts bypasses the current limiting resistance and connects AC power to the group of power supplies. The current limiting module includes a microcontroller connected to control the electronic switch and relay. The microcontroller is configured to sample the source AC power and detect a pattern of current flow through the electronic switch and current limiting resistance. In one implementation, the microcontroller samples the source AC voltage and the voltage drop across the series connected electronic switch and current limiting resistance. A program executed in the microcontroller includes calculations that determine when to close the relay and bypass the current limiting resistance by detecting changes in power flow through the current limiting resistance that reliably correspond to a time when the capacitors in the power supplies have completed charging and it is safe to close the relay. In one implementation, the pattern of power flow through the current limiting resistance is detected using a calculation that compares a half cycle of power flow through the current limiting resistance to applied AC power for the same half cycle. In another implementation, the pattern of power flow through the current limiting resistance is detected by comparing successive half cycles of power flow through the current limiting resistance to each other. One embodiment of the active current limiter incorporates both calculations and closes the relay when one of the calculations is satisfied. According to aspects of the disclosure, the program may include a time limit between closure of the electronic switch and closure of the relay, even if the calculations are not satisfied.

The calculations are intended to detect a pattern of power consumption by the power supplies and may include steps to detect changes in the source AC power that change the pattern of power flow through the current limiting resistance and impact the accuracy of the calculations. According to aspects of the disclosure, the microcontroller is programmed to actively monitor the properties of the AC power source to detect changes in AC voltage and frequency that may corrupt the calculations. In one embodiment, the microcontroller is programmed to sample the AC power for changes during the half cycles being compared and determine a "healthy voltage" that will be stored for use in the calculations. In another embodiment, the duration of each half cycle of AC power is compared to a predetermined standard and half cycles falling outside of the predetermined standard are rejected to ensure that complete half cycles of the correct frequency are used in the calculations.

The calculations are based on simple addition, subtraction and division to minimize the need for processing power and increase the speed at which the calculations can be made. In one implementation, samples of source AC voltage and samples of voltage drop across the current limiting resistance are added together (summed) on a running basis for each half cycle of AC power and are stored for use in the calculations. The sum of source AC voltage (VLine) and the sum of voltage drop across the current limiting resistance (VDrop) are used to calculate the difference between the source AC voltage and the voltage drop across the current limiting resistance by subtracting VDrop from VLine (VLine−VDrop=VDiff). The values of VLine, VDrop, and VDiff are used in the calculations. In some implementations, the calculations include steps to confirm that the AC source voltage has not changed at a time and in a magnitude that would result in a false positive result. The microcontroller may be programmed to ignore the results of calculations when the AC source voltage has changed during the half cycle being compared and wait for the AC source voltage to stabilize before relying on the results of the calculations.

More specifically, one embodiment of an active inrush current limiter and method of limiting inrush current includes the steps of:

Taking measurements of the voltage of the AC power source at regular intervals for each positive and negative half cycle, adding the values of the measurements together, and saving the sum as VLine (n), where (n) is the most recent or current half cycle.

Taking measurements of the voltage drop across the current limiting resistance at regular intervals for each positive and negative half cycle of AC power, adding the values of the measurements together, and saving the result as VDrop(n), where (n) is the most recent or current half cycle.

Subtracting VDrop(n) from VLine(n) to generate VDiff(n).

Closing the relay to bypass the current limiting resistance if:
  VDiff(n)≥a predetermined percentage of VLine(n), or
  VDiff(n)<VDiff(n−1) (where (n−1) represents the previous half cycle), or
  a predetermined time X has elapsed.

An alternative embodiment of an active inrush limiter and method include the steps of:

Measuring the voltage of the AC power source by digitally sampling many times over the duration of each half cycle of the AC source and computing an average value of VLineavg for each half cycle n.

Measuring the voltage drop across the current limiting resistance by digitally sampling many times over the duration of each half cycle of the voltage drop, and computing an average value VDropavg for each half cycle n.

Closing the relay to bypass the current limiting resistance if:
  VLineavg(n)−VDropavg(n)≥a predetermined percentage of VLineavg(n), or
  VLineavg(n)−VDropavg(n)<VLineavg(n−1)−VDropavg(n−1) (where (n−1) represents the previous half cycle), or
  A predetermined time X has elapsed.

The alternative of calculating an average over each half cycle includes the step of summing the voltage measurements for each half cycle. The disclosed mathematical treatments remove the effect of variations in line voltage on the decision of when to bypass a current limiting resistance, while using simple calculations that can be performed quickly using limited computing power. The averages of the second disclosed method may be taken on a subset of the voltage measurements taken during a half cycle, so long as the comparison is of averages calculated from the same subset of measurements.

BRIEF DESCRIPTION OF THE DRAWINGS

FIG. 1 illustrates an active inrush current limiter installed between an on/off control of an AC source and power supplies that will draw inrush current when the on/off control is turned on;

DETAILED DESCRIPTION

Figure 1:
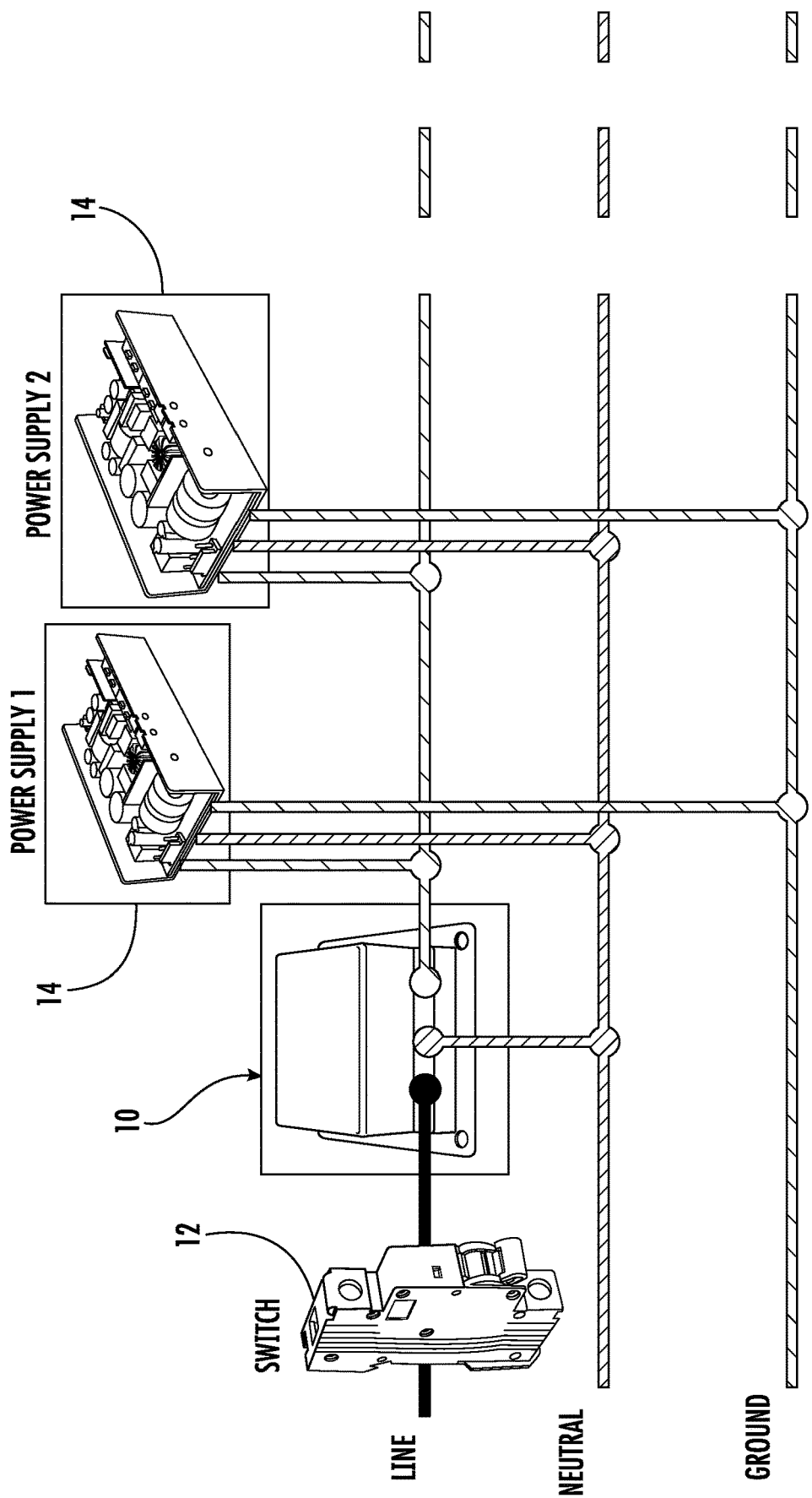

Exemplary embodiments of an active inrush current limiter and method of limiting inrush current will now be described with reference to the drawings. In describing embodiments illustrated in the drawings, specific terminology will be used for the sake of clarity. However the disclosure is not intended to be limited to the specific terminology and it is to be understood that each specific element includes all technical equivalents that have a similar function, operate in a similar manner, and achieve a similar result.

The present disclosure relates to an active inrush current limiter 10 for connection between a source of alternating current such as a circuit breaker or ON/OFF switch 12 and multiple pieces of electrical equipment that incorporate a power supply having one or more smoothing capacitors. FIG. 1 illustrates an active inrush current limiter 10 in the form of a module connected between a circuit breaker 12 and two power supplies 14 associated with connected electrical equipment (not shown). The connected electrical equipment may be a group of computer servers or many LED luminaires, each of which includes a power supply 14. The power supplies 14 are connected to the AC line in parallel with each other, so the input resistance of the power supplies 14 is reduced, while the capacitance of the power supplies 14 is added together. The group of servers or LED luminaires are typically turned on at the same time by closure of a breaker or line switch 12, after which each power supply 14 seeks to charge its capacitors through the reduced parallel input resistance, causing an inrush current many times the current consumed when the devices are operating. The disclosed active inrush current limiter 10 is intended to limit this combined inrush current to a predetermined level below the capacity of the AC source.

Figure 6:
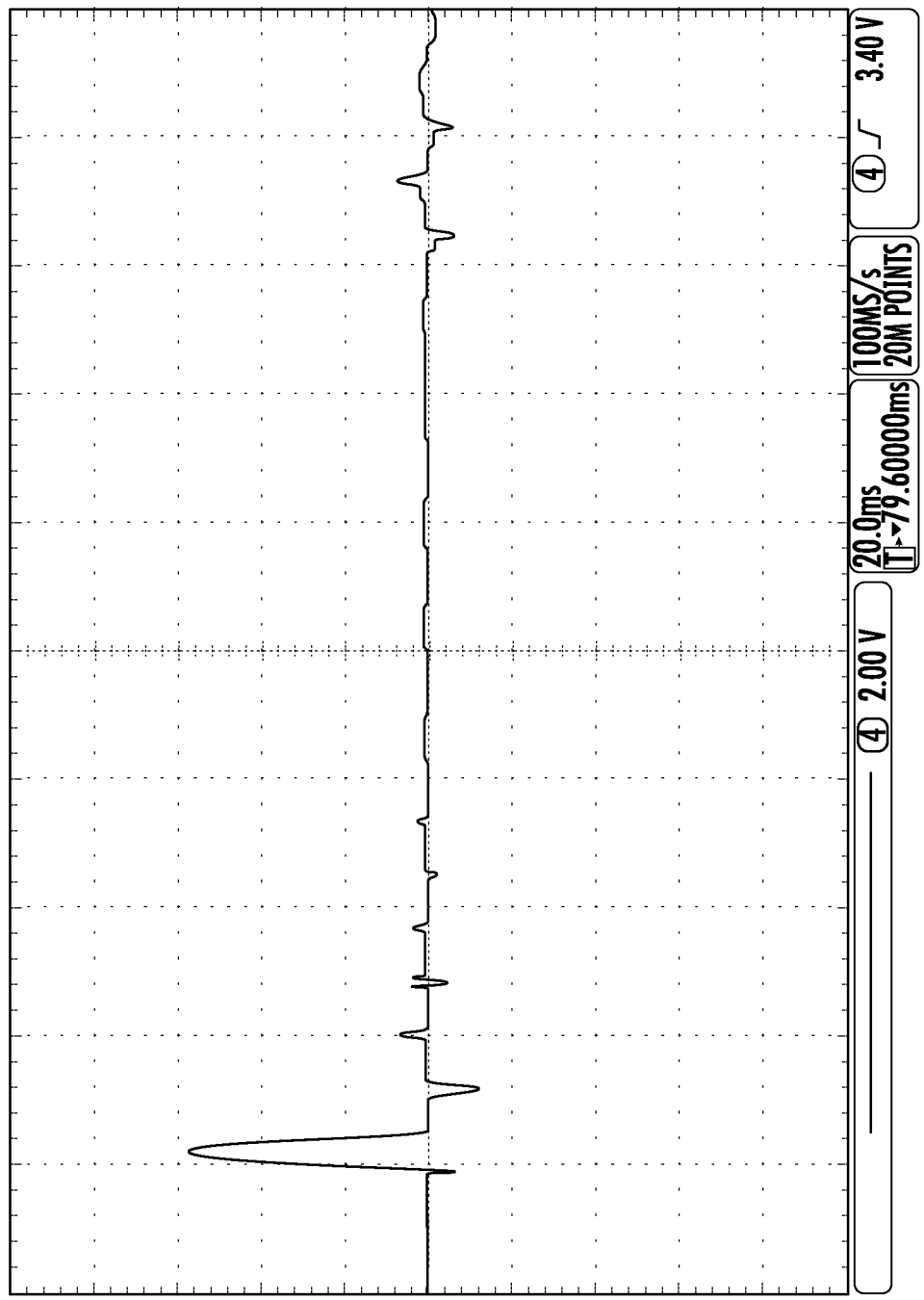
FIG. 6 is an oscilloscope trace showing inrush current drawn by two 500 watt power supplies connected to an AC source without the disclosed active inrush current limiter.
Figure 7:
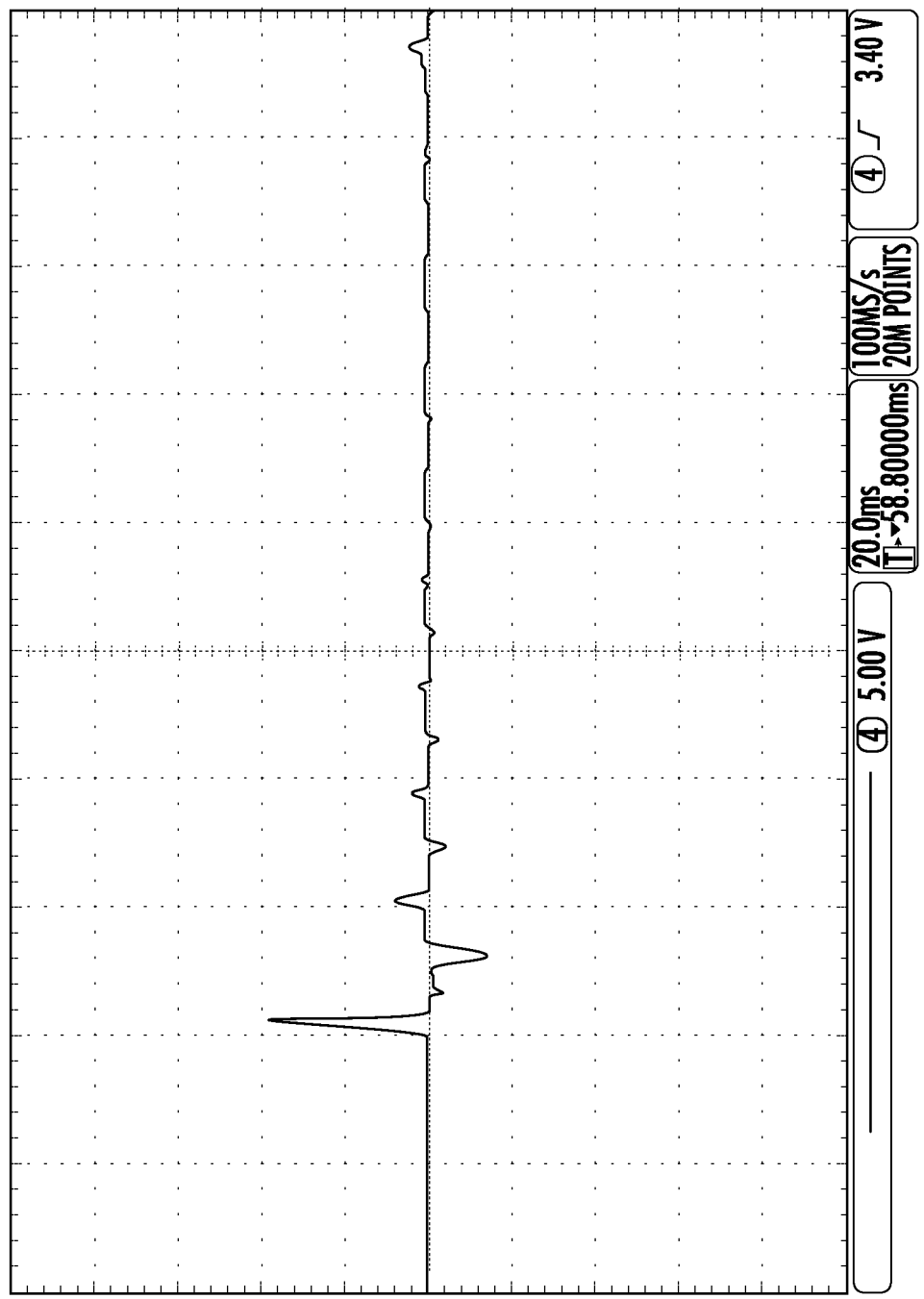
FIG. 7 is an oscilloscope trace showing inrush current drawn by five 500 watt power supplies connected to an AC source without the disclosed active inrush current limiter.

FIG. 6 is an image of an oscilloscope trace of inrush current from a 268V AC power source (breaker or line switch) connected to two 500 watt power supplies 14 without an active current inrush limiter. When the AC switch or breaker 12 is closed, a large inrush current of 60 Amps is observed. FIG. 7 is an image of an oscilloscope trace of inrush current from an AC power source (breaker or line switch) connected to five 500 watt power supplies without an active inrush current limiter. When the AC switch or breaker is closed, an inrush current of 92 Amps is observed. It will be apparent that closure of a breaker or switch has no specified time relation to the AC power signal and does not occur at a zero crossing of the AC power, which tends to increase the inrush current and stress on electronic components of the power supplies 14.

Figure 2:
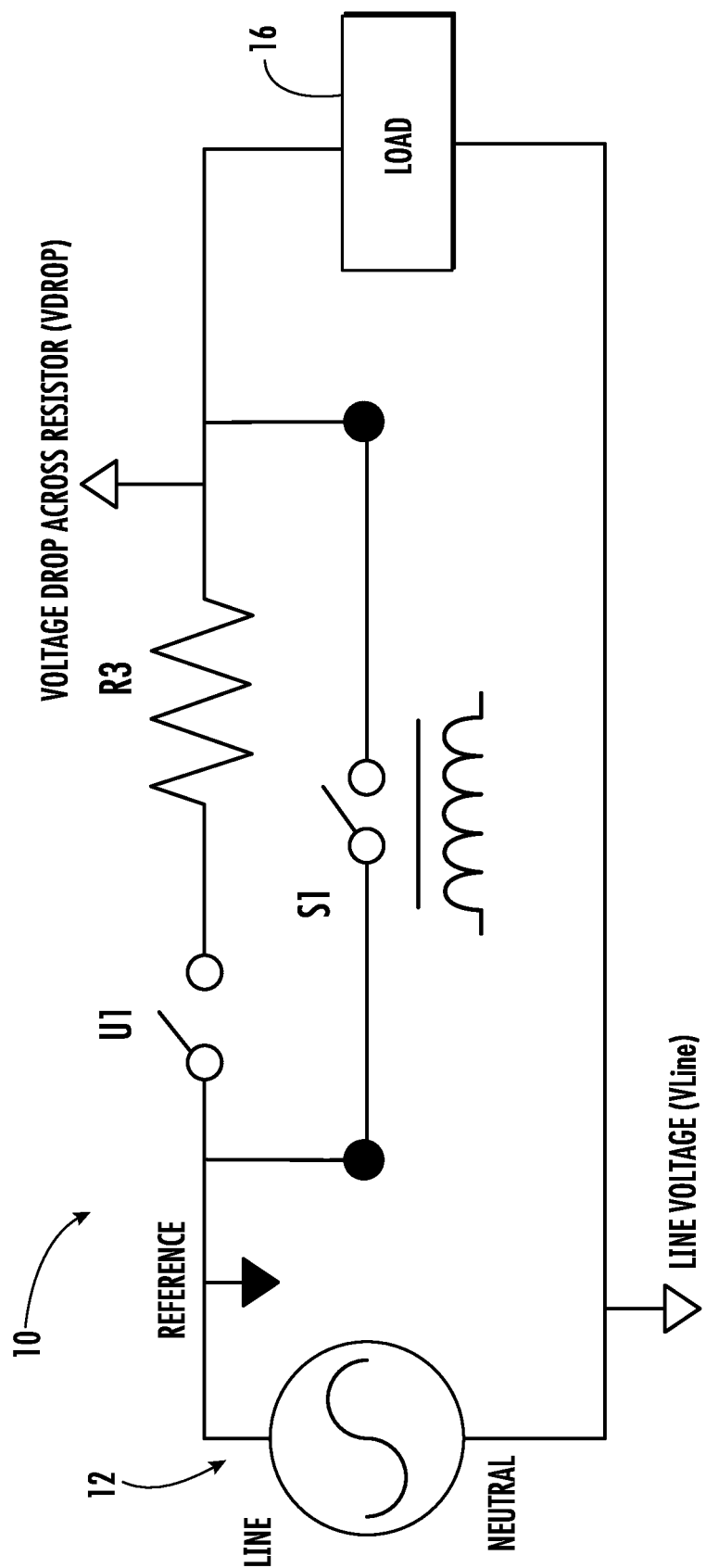
FIG. 2 is a schematic of selected components of a representative active inrush current limiter connected between an AC source and a load including capacitors that will draw inrush current.

FIG. 2 is a schematic representation of selected components of one example of an active inrush current limiter 10 connected between a source of alternating current (AC) power 12 and a load 16. The load 16 represents a group of power supplies 14, each having a diode bridge for rectification and one or more smoothing capacitors. The combined capacitance of a group of power supplies 14 may be 3000 µF, but the capacitance may be greater or less than this depending upon the number and type of power supplies connected to a circuit. A Triac U1 is arranged to connect AC power to the load 16 through a current limiting resistance R3. Those skilled in the art will recognize that the current limiting resistance R3 may include one or more resistors and will be referred to in this application as "the current limiting resistance" or "current limiting resistor," with these terms being used interchangeably. According to aspects of the disclosure, the Triac U1 is configured to turn on at a zero crossing of the AC power, reducing initial current delivered to the load 16 through the current limiting resistor R3. Other forms of electronic switch may be used in place of the Triac. The current limiting resistor R3 may take the form of a thermistor having a negative temperature coefficient (NTC), the resistance of which decreases as the thermistor is heated by current flow. A relay S1 has a set of contacts that close to bypass the Triac U1 and current limiting resistance R3, thereby connecting AC power directly to the load 16 after inrush current has been suppressed by the active inrush current limiter 10.

The disclosed relay S1 is an electromechanical relay with an electromagnetic coil arranged to move a set of relay contacts from a normally open position to a closed position which connects AC power directly to the load. Although a solid state relay could be used in the disclosed active inrush current limiter, solid state relays are not preferred because they continue to dissipate energy even in the "closed" position and may lack the necessary current carrying capacity. An electromechanical relay is advantageous for use in the disclosed active inrush current limiter because the closed contacts do not dissipate energy when in the closed position. Electromechanical relays are relatively inexpensive and have high reliability when properly matched to the current delivery requirements for a particular use. One drawback of an electromechanical relay is a delay of between 5 ms and 15 ms between the relay receiving a signal to close and the time that the relay contacts actually close. As discussed below, the delay in an electromechanical relay can be compensated for by sending a signal to close the relay before the time the relay contacts are intended to be closed.

Figure 3:
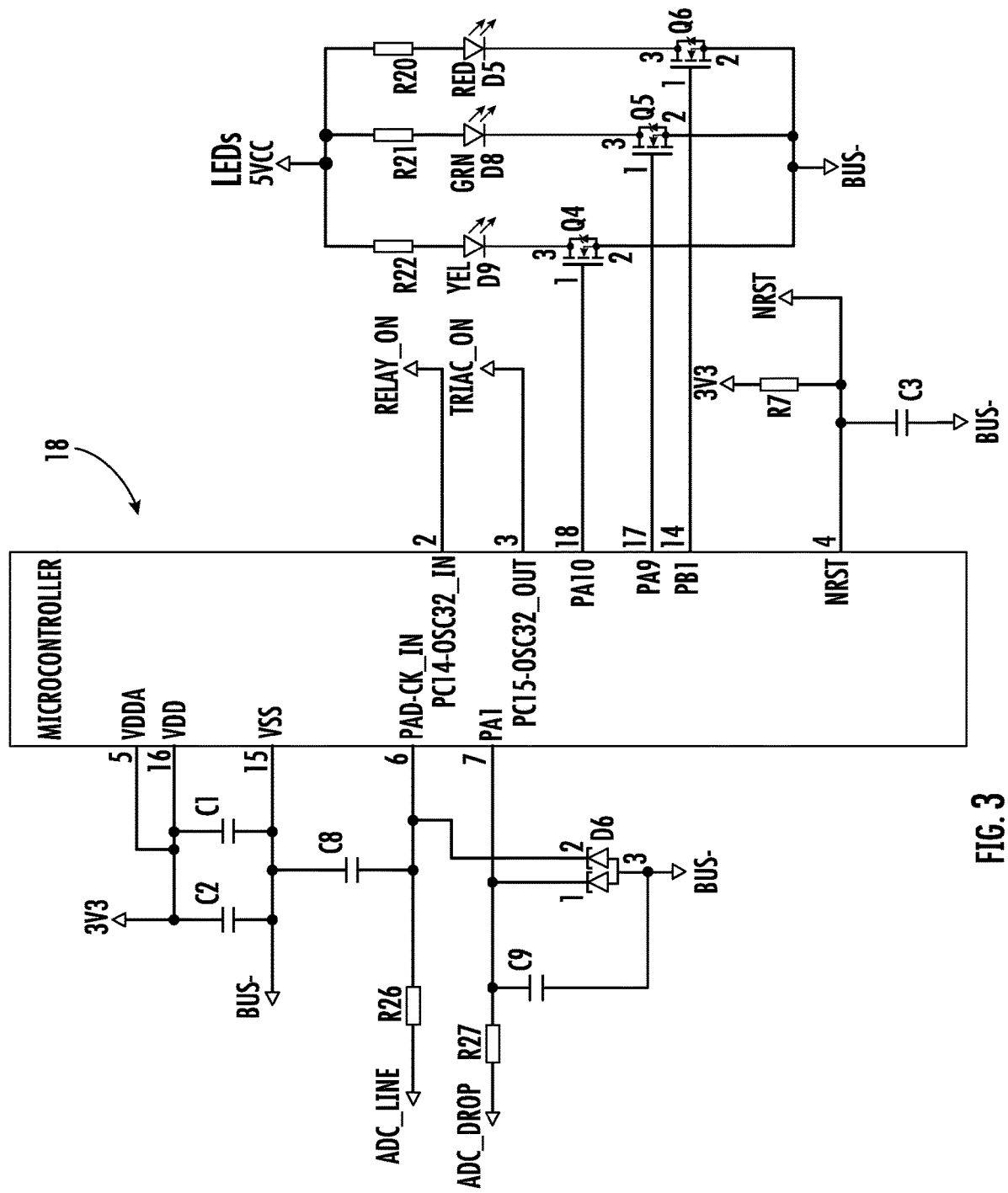
FIG. 3 is a schematic of a microcontroller for use in an active inrush current limiter showing selected inputs and outputs of the microcontroller that interact with the components illustrated in FIG. 2.
Figure 4:
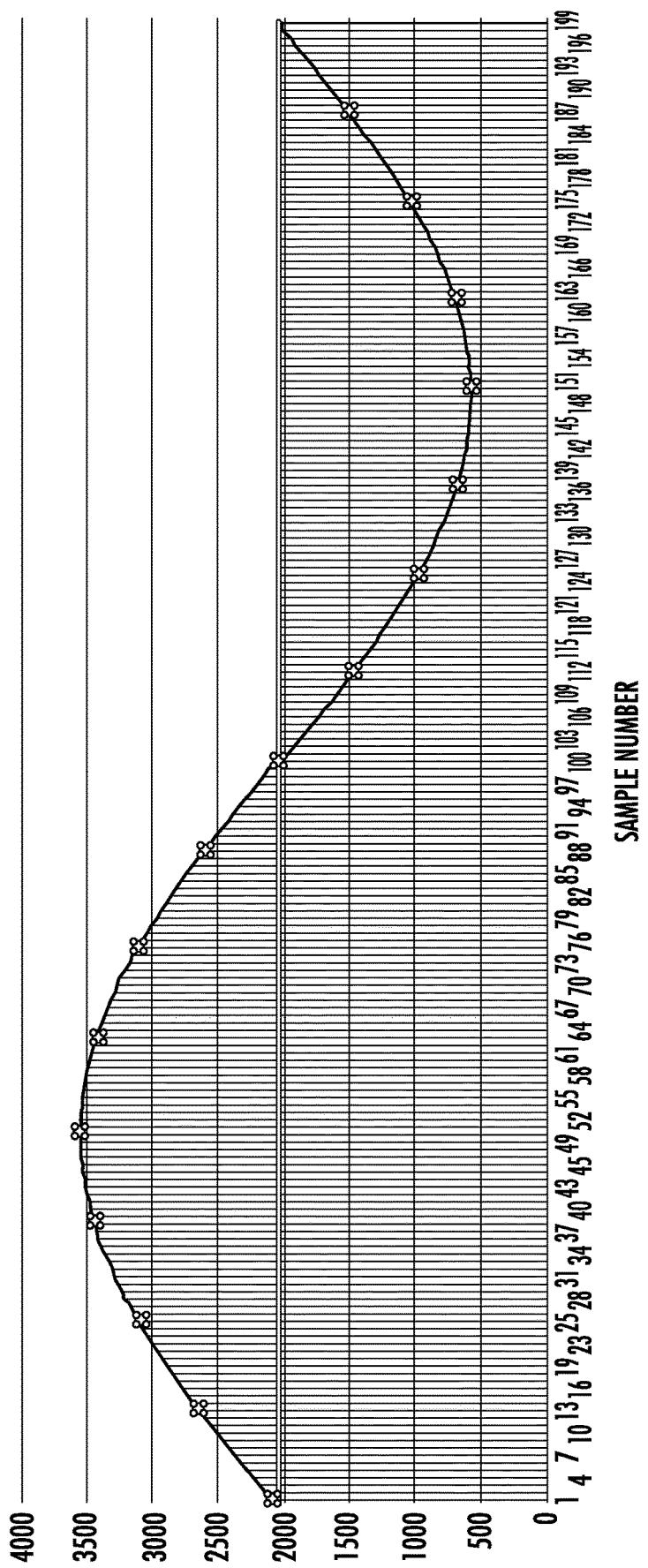
FIG. 4 is a graphical representation of one positive and one negative half cycle of alternating current divided into a plurality of regular intervals for voltage measurements according to aspects of the disclosure.

FIG. 3 illustrates a microcontroller 18 for use with the active inrush current limiter 10 of FIG. 2. The microcontroller 18 includes memory for storage of program instructions, a processor for executing the program instructions, along with programmable inputs and outputs. Microcontrollers come in a variety of configurations and may be selected by those skilled in the art based upon cost, processing speed/power, memory capacity, and the number and type of inputs and outputs. In this disclosed embodiment of an active inrush current limiter 10, the microcontroller 18 is configured to control the Triac U1 with signal TRIAC_ON and the relay S1 with signal RELAY_ON. According to aspects of the disclosure, the microcontroller 18 is connected to sample the voltage of the AC power source between Reference and Line Voltage (VLine) in FIG. 2, and sample the voltage drop across the series connected Triac U1 and current limiting resistance R3 at Voltage Drop Across Resistor (VDrop) of FIG. 2. VLine is delivered to the microcontroller 18 as ADC_LINE and the VDrop is delivered to the microcontroller 18 as ADC_DROP. ADC_LINE and ADC_DROP are connected to inputs PA0 and PA1 of the microcontroller 18, respectively, which are configured as 12 bit analog to digital converters (ADC). The ADCs are configured to convert sample values for both the positive and negative half cycles of the VLine and VDrop to digital values above and below a zero line value of 2048 as illustrated in FIG. 4. According to aspects of the disclosure, the microcontroller 18 is programmed to recognize the end of each half cycle of AC power when the value of ADC_LINE and ADC_DROP pass through 2048, representing where the AC power signal passes through 0V, referred to as a "zero cross." FIG. 3 also illustrates output connections to yellow (D9), green (D8) and red (D5) LEDs used as status indicators on the active inrush current limiter 10.

FIG. 4 is a graphical representation of one positive half cycle and one negative half cycle of VLine for 50 Hz 268V AC power in a 12 bit ADC, showing 100 representative time points in each half cycle at which VLine and VDrop will be sampled. FIG. 4 illustrates the zero cross at 2048 of the 12 bit ADC, which converts voltage samples to digital values for use in calculations performed in the microcontroller 18. For one disclosed embodiment of an active inrush current limiter 10, the microcontroller 18 is programmed to sample VLine and VDrop every 100 μs, although other intervals may be used. As shown in FIG. 4, each half cycle of 50 Hz AC power will be sampled every 100 μs generating 100 samples. The same sampling rate would generate approximately 83 samples for each half cycle of 60 Hz AC power. For the values of VLine and VDrop to be useful in the disclosed calculations, the same number of samples of each half cycle must be taken at the same times, which may be at regular or irregular intervals spanning the entire half cycle. A zero crossing defines the end of each half cycle and the beginning of the next. The disclosed method does not use the peak value of VLine or VDrop, reducing the effect of noise in the AC power signal on the disclosed calculations. As will be discussed in greater detail below, the samples for each half cycle are added together on a running basis, and the sum of the values for VLine and VDrop for each half cycle are saved and used by the program running in the microcontroller 18.

Figure 8:
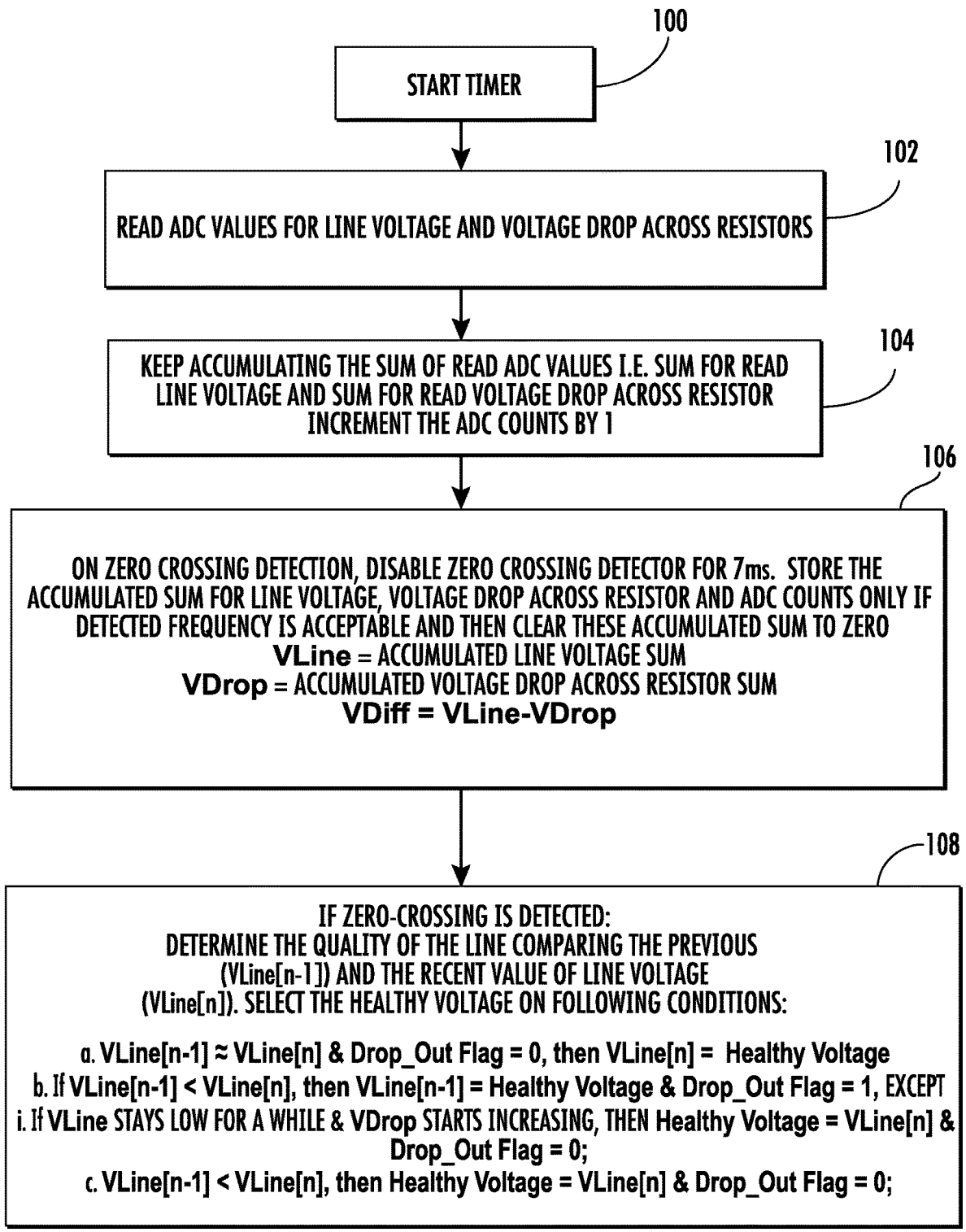
FIG. 8 is a flow chart illustrating a first group of steps in an algorithm executed by a program installed in a processor of the microcontroller of FIG. 3.
Figure 9:
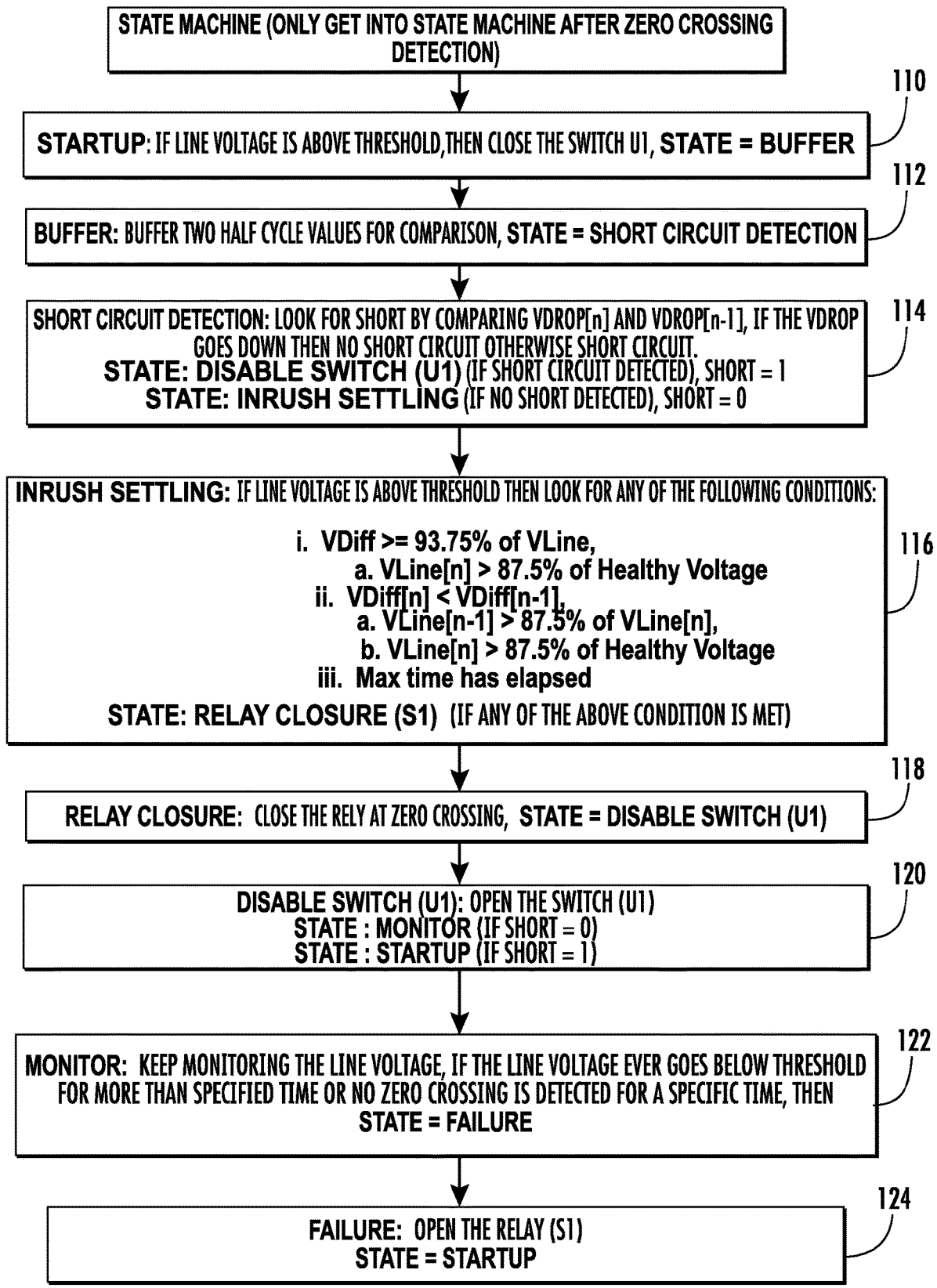
FIG. 9 is a flow chart illustrating a second group of steps in an algorithm executed by a program installed in a processor of the microcontroller of FIG. 3.

FIGS. 8 and 9 are a flow chart illustrating steps in a program stored in memory on the microcontroller 18 of the disclosed active inrush current limiter 10. The steps in the program implement steps in one exemplary method of limiting inrush current according to aspects of the disclosure. One objective of the disclosed method is to provide a reliable determination of when to turn on the relay S1 and bypass the current limiting resistance R3 by actively monitoring the AC line voltage and current drawn by the load 16 through the Triac U1 and current limiting resistor R3. If the relay S1 is closed too soon, some of the connected power supplies will not have completed charging their capacitors, and when the current limiting resistance R3 is bypassed a surge of current will result. If the relay S1 is closed too late, then a perceptible delay may occur between the closure of a switch to turn on a group of LED luminaires and the delivery of power to the LED luminaires.

FIG. 8 illustrates steps in a program stored in the microcontroller memory and executed by the microcontroller processor to collect sample measurements and test the quality of the AC power signal before the Triac U1 is turned on. The steps illustrated in FIG. 8 may be described as a routine that runs constantly in the background and provides information used by a state machine illustrated in FIG. 9. FIG. 8 begins at step 100 with starting a timer that will be used to coordinate actions of the microcontroller and define a maximum time between closure of the Triac U1 and closure of the relay S1 (the maximum duration of inrush current limiting), as will be described below. At step 102 the program reads (samples) the values of VLine and VDrop simultaneously every 100 μs. At step 104, the converted digital values of VLine and VDrop are added together to accumulate a running sum for each half cycle of AC voltage. The program is configured to convert all digital values of VLine and VDrop to positive values before the digital values are added together. As the digital values of each sample of VLine and VDrop are added to the previously accumulated samples, an ADC timer is incremented by one.

At step 106, upon detection of a zero cross, the program disables detection of another zero cross for 7 ms to avoid erroneous zero cross detections. Also at step 106, to ensure that complete half cycles of AC power are being sampled, the program references the number of ADC counts (sample intervals) between zero crosses and rejects periods between zero crosses indicating a frequency of less than 45 Hz (more than 110 ADC counts) or greater than 71 Hz (less than 70 ADC counts). If a set of samples does not fall within the acceptable frequency range, it is discarded in favor of the next set of samples, which are again tested for an acceptable frequency. It will be noted that the acceptable frequencies include 50 Hz and 60 Hz, which are the European and North American standard frequency for AC power, respectively. The program can be modified as needed to accommodate different AC power frequencies, for example those used on an aircraft or a marine vessel. When a set of samples for a half cycle of AC power represents an acceptable frequency, the accumulated sum of the digital values of VLine and VDrop are stored, and the registers in which the sums are accumulated are cleared. The accumulated sums of VLine and VDrop are used to calculate VDiff by subtracting the accumulated sum of VDrop from the accumulated sum of VLine (VDiff=VLine−VDrop). From this point forward in the description, the terms VLine and VDrop refer to the values of the accumulated sum for each half cycle and the value of VDiff calculated as discussed above.

The program for the active inrush current limiter includes calculations that are used as decision making tests. For example, a calculation may compare the value of VLine for two consecutive half cycles of AC voltage. In the description below, (n) following a variable refers to a current value, for example VLine(n) is the sum of the digital values for VLine for the most recently completed half cycle of AC voltage. The term (n−1) refers to the previous value, for example VLine(n−1) is the sum of the digital values for the half cycle of AC voltage before VLine(n). Those skilled in the art will recognize that the values of VLine for two cycles can be arranged in either order and the comparison adjusted to achieve the same desired result. For example, the calculation VLine(n−1)>87.5% of VLine(n) can alternatively be expressed 87.5% of VLine(n)<Vline(n−1). In addition, those skilled in the art will recognize that the variable VDiff is the difference between VLine and VDrop, so VDiff includes a measure of VLine that is not included in VDrop. According to aspects of the disclosure, comparing the values of VDiff for consecutive half cycles allows the program to identify when the capacitors of power supplies have completed charging and it is safe to close the relay S1. In the event of a change in AC input voltage, VDiff will include the rise or fall in VLine in a manner that VDrop would not. In the discussion of the program below, examples are provided for calculations. It will be understood that the exemplary calculations can be expressed differently and the disclosure is not limited to the specific calculations set forth below. The calculations may also be referred to as "tests" or "comparisons" in the discussion below.

At step 108 the program tests the quality of the AC power signal, looking for voltage decreases (drops, dips) or increases (surges, spikes) that may cause errors in determining when to close the relay S1. This part of the program identifies a "Healthy Voltage" for use in later calculations to avoid a situation where a change in AC line voltage would cause an erroneous result of calculations or comparisons used to decide when to close the relay S1. The program identifies the value of a half cycle of AC voltage (VLine) as a Healthy Voltage under the following circumstances:

a) There are no fluctuations in the AC line voltage and condition b) is not true, then the recent line voltage VLine(n) is identified and saved as the Healthy Voltage;

b) If the recent line voltage VLine(n) decreases significantly, the program sets a flag and does not evaluate AC line voltage according to step a) until the flag is cleared by meeting conditions b)(i) or c) below, and the previous value of line voltage VLine(n−1) is the Healthy Voltage, except;
   i. If the AC line voltage stays at the lower level long enough for VDrop to start increasing, then the recent line voltage VLine(n) becomes the Healthy Voltage;

c) If the recent line voltage VLine(n) is higher than the previous line voltage VLine(n−1) then the recent line voltage VLine(n) is the Healthy Voltage.

According to aspects of the disclosure, comparing the values of VLine for consecutive half cycles can identify changes in AC power that may impact charging of the capacitors and must be accounted for to ensure accuracy of the decision to close the relay S1. One example of a test for a falling AC line voltage is If VLine(n−1)>(112.5% of VLine(n)). If the outcome of this comparison is "true" then VLine has fallen significantly and the program sets a "Drop Out" flag and does not evaluate VLine according to a) (test for rising AC line voltage) until the Drop Out flag has been cleared by conditions b)(i) or (c) being met. According to b) above, until the Drop Out flag is cleared, the value of VLine(n−1) is saved as the Healthy Voltage. If the result of the test for falling AC line voltage is "true" then the program conducts an additional test: If (VDrop(n))>(VDrop(n−1)) to see whether the capacitors of the power supplies 14 are charging, which indicates the AC line voltage has settled at the lower value. When VLine falls and remains low (settles), at first the capacitors of the power supplies will stop charging, causing current flow through the current limiting resistor R3 to fall, making VDrop(n) less than VDrop(n−1). If VLine remains at the lower voltage for several cycles of AC power, then the capacitors will begin to charge again, making VDrop(n) greater than VDrop(n−1). According to b(i), if VDrop rises without an increase in VLine, the program clears the Drop Out flag and saves the recent value of AC line voltage Vline(n) as the Healthy Voltage. A correction factor may be added to the value of one or more variables used in the disclosed calculations to account for minor inaccuracies in the data because of tolerance of physical components. With a correction factor, the comparison of two cycles of VDrop is: (VDrop(n))>(VDrop(n−1)+Hysteresis_Counts) to compensate for component tolerances and increase the accuracy of the comparison. A representative test for a rise in the AC line voltage is: If VLine(n−1)<(87.5% of VLine(n)). In this case, if VLine(n) is greater than VLine(n−1) by more than a predetermined percentage (~14%), then this test is true, the Drop Out flag is cleared and VLine(n) is accepted as a "healthy voltage" that will be used in later calculations. A negative outcome of the tests for rising and falling AC line voltage means that the recent value of VLine(n) is saved as the Healthy Voltage according to a). The only condition that results in the value of VLine(n−1) being the Healthy Voltage is when the AC line voltage falls by a significant amount, but VDrop is not increasing, which corresponds to a drop in AC line voltage of short duration, for example less than about 80 ms. At the completion of step 108 of FIG. 8, the program has accumulated 2 half cycles of VLine and VDrop generated by an AC power signal of a frequency between 45 Hz and 71 Hz and has tested the AC power signal for variations to determine if a current value of VLine is a "Healthy Voltage" that can be used in later steps.

FIG. 9 illustrates a "state machine" part of the program that begins after detection of a zero cross and references data gathered and saved by the background routine of FIG. 8. A "state" is a situation of a system depending on previous inputs and causes a reaction on following inputs. One state is marked as the initial state; this is where the execution of the machine starts. A state transition defines for which input a state is changed from one state to another. Depending on the state machine type, states and/or transitions produce outputs. At step 110 the program enters a STARTUP state and determines whether the AC line voltage is above a pre-determined threshold such as 70 VRMS. One way to approximate the RMS value of the AC line voltage is to calculate an average for VLine (the sum of the digital values of VLine for a half cycle of AC power/ADC_counts=VLineAvg). For a sinusoidal waveform such as AC line voltage, VLineAvg is an acceptable approximation of the RMS value of the AC line voltage, and saves processing power by avoiding the more complex calculations necessary to determine RMS. At step 110, the program compares VLineAvg for a half cycle of AC power with the pre-determined threshold (such as 70 VRMS) and if the value of VLineAvg is equal to or greater than the predetermined threshold, then the threshold AC line voltage is present. and the state machine generates signal TRIAC_ON to turn on the Triac U1 to connect AC power to the load 16 through the current limiting resistor R3, and enters a BUFFER state.

At step 112, in the BUFFER state, the program accumulates two half cycles of VLine, VDrop and VDiff for use in calculations and enters a SHORT DETECTION state. Steps 102-108 of the background routine of FIG. 8 generate the data referenced by step 112 of the state machine. At step 114, the program is in SHORT DETECTION state and looks for a short between the active inrush current limiter 10 and the load 16 by comparing consecutive values of VDrop. If VDrop(n) is less than VDrop(n−1), then there is no short circuit, and if VDrop(n) is not less than VDrop(n−1) then there may be a short, the program disables (turns off) U1 by removing the TRIAC_ON signal and enters a DISABLE SWITCH (U1) state and repeats steps 110-114. If step 114 indicates a potential short after a predetermined number of repetitions of steps 110-114, then the state machine enters a FAULT state, turns off the Triac U1, turns on the red LED D5 to indicate a fault. If no short circuit is detected, then the program enters an INRUSH SETTLING state.

At step 116, the program is in the INRUSH SETTLING state and after confirming that the AC line voltage is above a predetermined threshold such as the threshold used in step 110, the program applies two different tests using the values of VLine and VDiff to determine whether the capacitors of the load 16 have completed charging and it is safe to turn on the relay S1. If the AC line voltage is not greater than the threshold, then the program waits until the AC line voltage is above the threshold to apply the tests. In a first test (i): If VDiff(n)>93.75% of VLine(n) and If VLine(n)>87.5% of Healthy Voltage, then close relay S1. The comparison VDiff(n)>93.75% of VLine(n) looks for a condition where the voltage drop VDrop across the current limiting resistor R3 has fallen to a low level, indicating that the capacitors of connected power supplies have substantially completed charging. According to aspects of the disclosure, the program includes a "Healthy Voltage" check in each of the two tests used to determine when to close the relay S1. In step 116 if the outcome of VDiff(n)>93.75% of VLine(n) is true, the program then compares VLine(n) to the Healthy Voltage determined at step 108 of FIG. 8. The comparison VLine(n)>87.5% of Healthy Voltage checks to make sure that the AC line voltage has not dropped relative to the Healthy Voltage by an amount that would produce a false outcome of the comparison VDiff(n)>93.75% of VLine(n).

If the first test of step 116 is false, then the program applies a second test (ii): If (VDiff(n))<VDiff(n−1), which looks for the condition where the capacitors in the load 16 have completed charging and the power supplies 14 are turning on and beginning to draw operating current, so it is safe to close relay S1. VDiff(n) will be greater than VDiff(n−1) as the capacitors charge and current flow through current limiting resistor R3 falls. VDiff(n) may include a correction factor to compensate for component tolerances and improve the accuracy of the comparison of VDiff(n) to VDiff(n−1). When the capacitors have charged, the power supplies turn on and begin drawing operating current through current limiting resistor R3, which will cause VDrop to increase and VDiff to decrease, making (VDiff(n))<VDiff(n−1) true. According to aspects of the disclosure, if (VDiff(n))<VDiff(n−1) is true, the second test (ii) also includes a check of VLine to determine whether the AC line voltage has increased: VLine(n−1)>87.5% of VLine(n). The check for a significant increase in VLine and the comparison to Healthy Voltage identify changes in the AC power signal that can result in a false outcome of the test: (VDiff(n))<VDiff(n−1). The second test (ii) also includes a comparison to Healthy Voltage: If VLine(n)>87.5% of Healthy Voltage looks for a significant drop in VLine when compared to the Healthy Voltage selected at step 108.

If either of the first test (i) or second test (ii) is true, and the check of VLine and Healthy Voltage check confirm that the AC power has not changed in a way that would produce a false outcome of the tests, then the program at step 118 enters a RELAY CLOSURE state and generates the RELAY_ON signal to close the relay S1 and bypass the Triac U1 and current limiting resistor R3. According to aspects of the disclosure, the RELAY_ON signal is generated a predetermined time before the next zero cross, so the relay contacts close at or very close to a zero cross, which reduces the initial current through the contacts and also reduces the likelihood of a secondary inrush current when the AC power is directly connected to the load. The predetermined time between generating the RELAY_ON signal and the next zero cross is determined from the properties of the electromechanical relay S1 and can be adjusted in the program as needed. In one embodiment of the active inrush current limiter 10, the predetermined time is 6 ms.

Step 116 of the program limits the duration of the INRUSH SETTLING state at (iii) by incrementing an inrush counter each time the first and second tests of step 116 are false and the program remains in the INRUSH SETTLING state. After a predetermined maximum number of inrush counts, the program enters the RELAY CLOSURE state at step 118 and generates the RELAY_ON signal in advance of the next zero cross as described above. The maximum number of inrush counts is used to define the maximum time before the relay S1 is turned on even if neither of the tests in step 116 are true and the program remains in the INRUSH SETTLING state. The maximum time can be adjusted in the program to suit different environments in which the active inrush current limiter 10 will be used. A representative maximum time is 500 ms, but the time may be between 200 ms and 800 ms, as needed.

After the signal RELAY_ON is generated at step 118, the program enters a DISABLE SWITCH state at step 120, where the TRIAC_ON signal is removed, turning off Triac U1. With the relay S1 contacts closed and the Triac U1 turned off, AC power 12 is directly connected to the load 16. This represents a normal state of operation where inrush current has been suppressed until the capacitors in the load 16 have charged, and AC power is directly connected to the load 16, bypassing the current limiting resistor R3. The program turns on the green LED D8 to indicate normal operation. At step 122, the program enters a MONITOR state, which actively monitors the AC line frequency and voltage VLine. If VLine falls below a threshold for more than a predetermined period of time or no zero crossing is detected for a specified time, then the program enters a FAILURE state at step 124. In the FAILURE state, the program removes the RELAY_ON signal, opening the relay S1 and the program returns to the STARTUP state. The MONITOR state ensures that if the AC power is interrupted or reduced below a threshold for a time that would discharge or partially discharge the capacitors in the load, the active inrush current limiter 10 returns to the STARTUP state where inrush current is suppressed. According to aspects of the disclosure, the threshold voltage for the MONITOR state may be set at or just below the threshold voltage used in step 110, which is determined based upon the minimum input voltage required by the load 16. In one example, the threshold voltage in step 110 is 70 VRMS and the threshold voltage in the MONITOR state is 68 VRMS. As in step 110, the threshold voltage of 68 VRMS can be approximated by calculating an average of samples for a half cycle of AC power. In the MONITOR state, the program looks for zero crossings detected at step 106 of the background routine of FIG. 8. If a zero crossing is not detected for a pre-determined period, then the program enters a FAILURE state, opens the relay S1 and returns to the STARTUP state at step 110. When relay S1 is opened, the program turns off the green LED D8. The MONITOR state guards against a loss of AC power during normal operation that would cause an inrush current after the initial inrush current has been suppressed.

Figure 5:
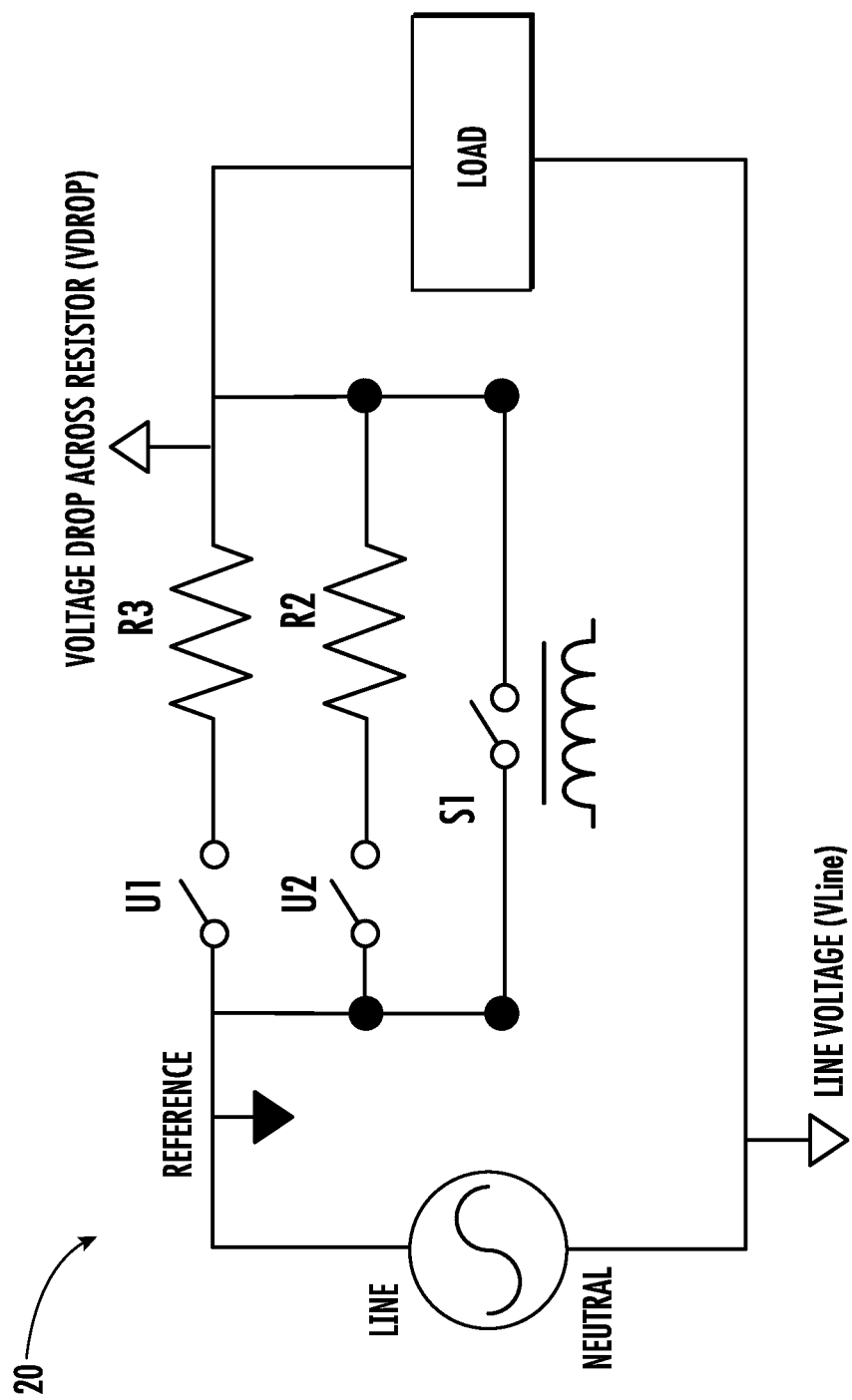
FIG. 5 is a schematic showing selected components of a second embodiment of an active inrush current limiter connected between an AC source and a load including capacitors that will draw inrush current.

The active inrush current limiter 10 of FIG. 2 includes only a single current limiting resistance R3 in series with an electronic switch (Triac) U1. FIG. 5 illustrates an alternative embodiment of an active inrush current limiter 20 that includes more than one series connected current limiting resistance and electronic switch, with the additional current limiting resistor R2 and electronic switch U2 being arranged in parallel with current limiting resistor R3 and electronic switch U1. One branch of current limiting resistance may have a higher value of resistance than the other branch. This allows a greater range of input voltages, where at a lower input voltage the branch with lower resistance is used, and at the higher input voltage, the branch with the higher resistance is used. Further, to reduce the likelihood of inrush current after closure of the relay S1, both branches can be used to reduce the current limiting resistance by turning on the other electronic switch U1 or U2 immediately ahead of closure of the relay S1. The reduced, but not eliminated, current limiting resistance of the combined parallel current limiting resistances R2 and R3 will allow increased current flow to the downstream power supplies, while keeping the increased current flow below a predetermined limit. When the relay S1 is closed, the increased current flow allowed by the parallel current limiting resistances R2 and R3 has met the demand for current and reduced the likelihood of a surge in current after closure of the relay contacts. The reduced current limiting resistance can be used for a predetermined length of time before closure of the relay, for example 3 AC half cycles. In the context of the disclosed program illustrated in FIGS. 8 and 9, the secondary inrush current limiting resistor would be used between the INRUSH SETTLING state of step 116 and the RELAY CLOSURE state of step 118 of FIG. 9.

Figure 10:
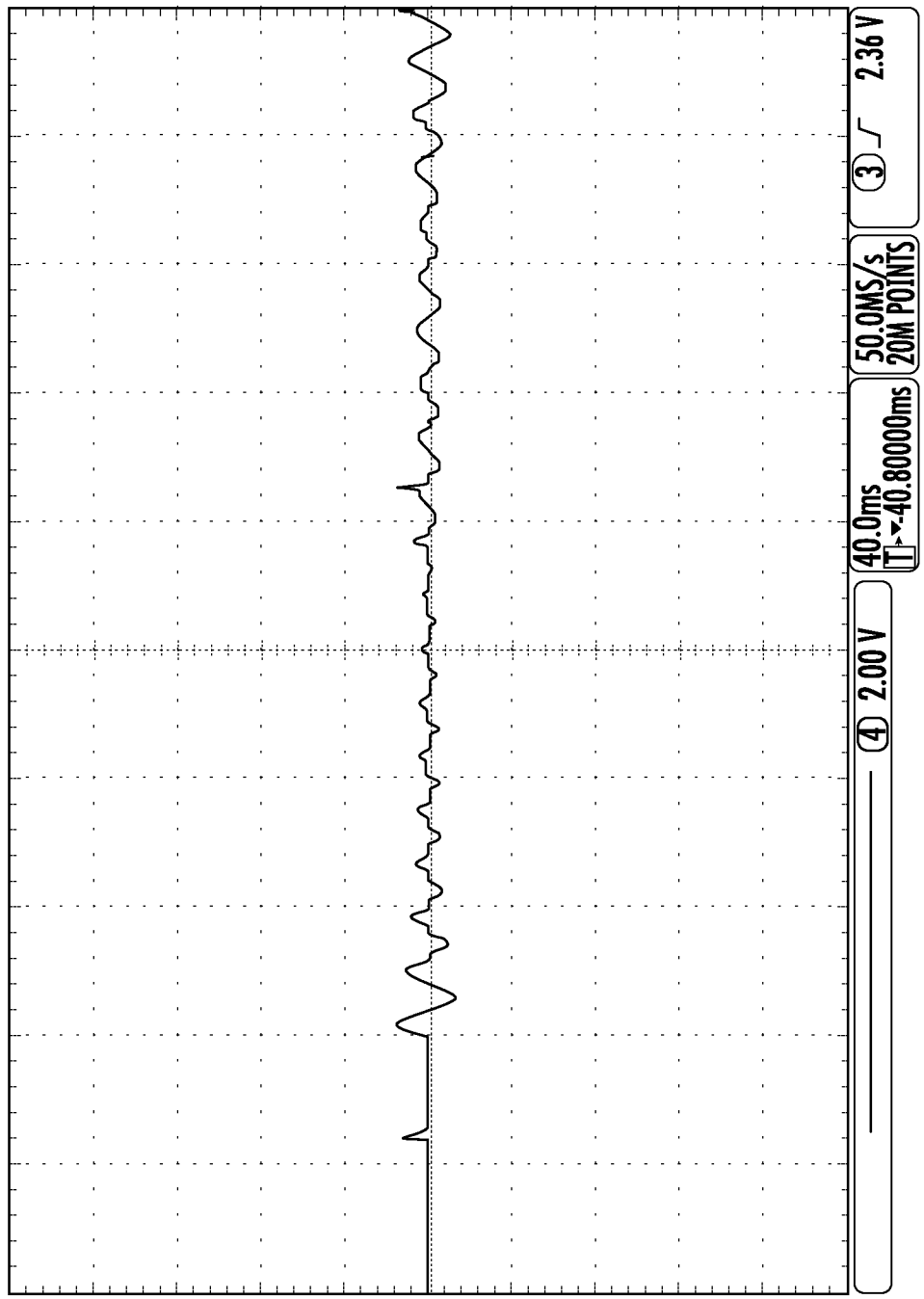
FIG. 10 is an image of an oscilloscope trace showing inrush current through an active inrush current limiter according to aspects of the disclosure connected between an AC source and two 500 watt power supplies.
Figure 11:
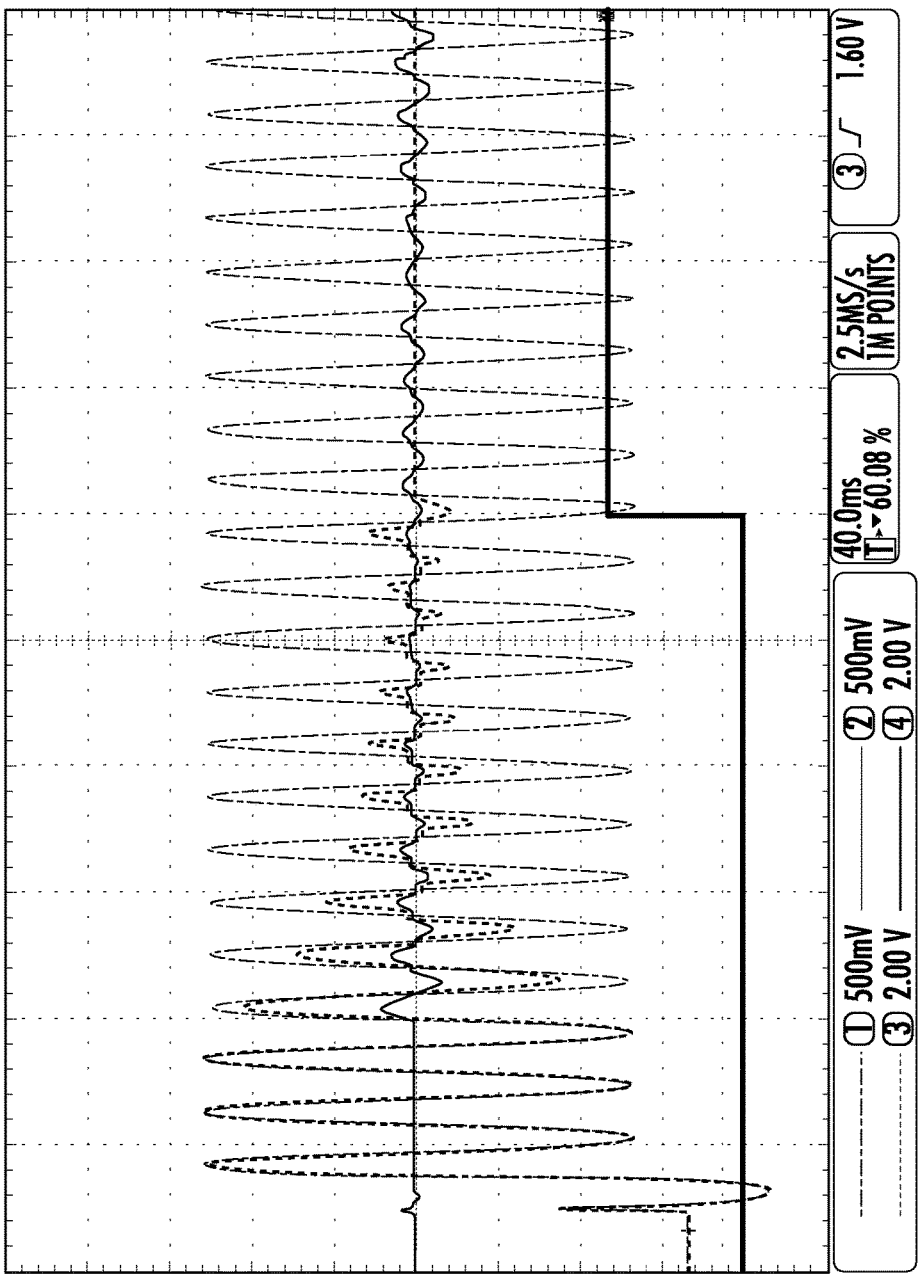
FIG. 11 shows oscilloscope traces corresponding to voltages, currents and control signals relevant to one disclosed embodiment of an active inrush current limiter and associated method of limiting inrush current connected between an AC source and two 500 watt power supplies.
Figure 12:
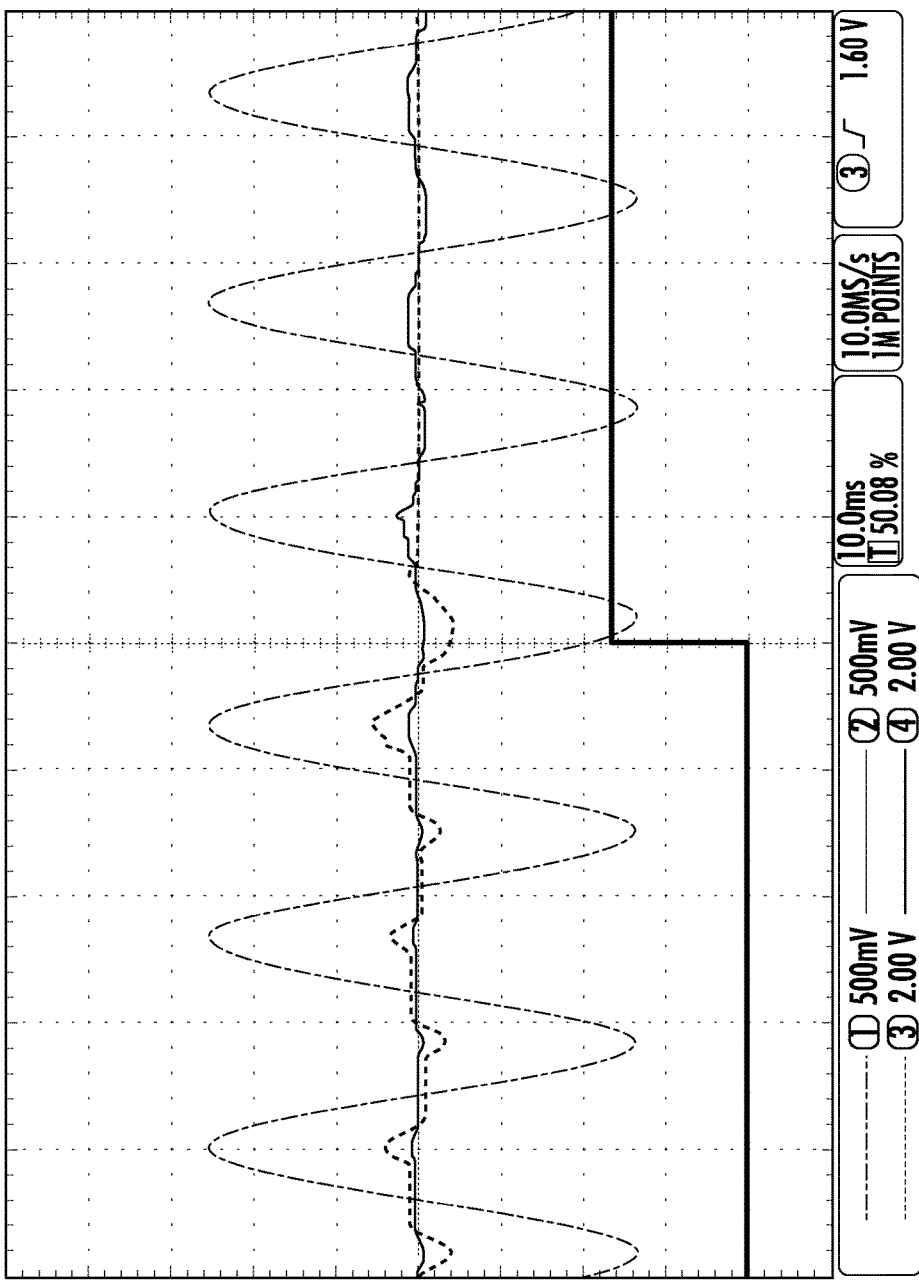
FIG. 12 shows the oscilloscope traces of FIG. 11 on an expanded time scale centered on a bypass relay closure control signal generated by the active inrush current limiter.

FIG. 6 illustrates a large spike of inrush current drawn by two 500 watt power supplies connected to an AC power source without the disclosed active inrush current limiter 10. FIG. 10 illustrates AC current drawn by two 500 watt power supplies with an active inrush current limiter 10 connected between the AC power source and the power supplies. The inrush current is limited to a maximum value of 10 Amps, in contrast to the 60 Amps in the absence of the active inrush current limiter 10. FIGS. 11 and 12 are screen shots of an oscilloscope connected to display the AC input current, the voltage drop across the Triac U1 and current limiting resistor R3 (voltage drop after thermistors), the AC input voltage, and the relay turn on signal RELAY_ON. The time scale is expanded in FIG. 12 to more clearly show the relationship between these variables for two cycles of AC power before and after the RELAY_ON signal is generated. From FIGS. 11 and 12, we see that the AC input voltage (VLine) remains constant, while the voltage drop across the Triac U1 and current limiting resistor (VDrop) and AC input current decrease. The relationship between VLine (AC input voltage) and VDrop (voltage drop after thermistors) shows that capacitors in the load are charging and as the capacitors charge the current flow through the current limiting resistor and resulting voltage drop across the current limiting resistor (VDrop) decline. As VDrop decreases, VDiff (VLine−VDrop) increases. With reference to FIG. 12, the relationship between VLine (AC input voltage) and VDrop (voltage drop after thermistors) changes during the last cycle of AC power before the RELAY_ON signal is generated. With the AC line voltage constant, VDrop stops decreasing and starts to increase, meaning that VDiff stops increasing and starts to decrease. This indicates that the capacitors in the power supplies have completed charging and the power supplies are turning on and starting to draw operating current. In this case, the active inrush current limiter 10 detected the decrease in VDiff during the last two half cycles of AC line voltage, which satisfied test (ii) of step 116 in the INRUSH SETTLING state. With VLine constant, test (ii)(a) is true, the Healthy Voltage check in test (ii)(b) is also true, so the program generates the RELAY_ON signal, disable the Triac U1 by removing the TRIAC_ON signal after the relay S1 contacts close and enters the MONITOR state. FIG. 12 also illustrates that the RELAY_ON signal is generated in advance of a zero cross and the relay contacts close near the zero cross, as indicated by VDrop (voltage drip after thermistors) falling to zero. Finally, there is a very small rise in AC input current after closure of the relay contacts, indicating that the capacitors in the load were charged and the decision to close the relay S1 and bypass the current limiting resistor R3 was correctly timed.

Figure 13:
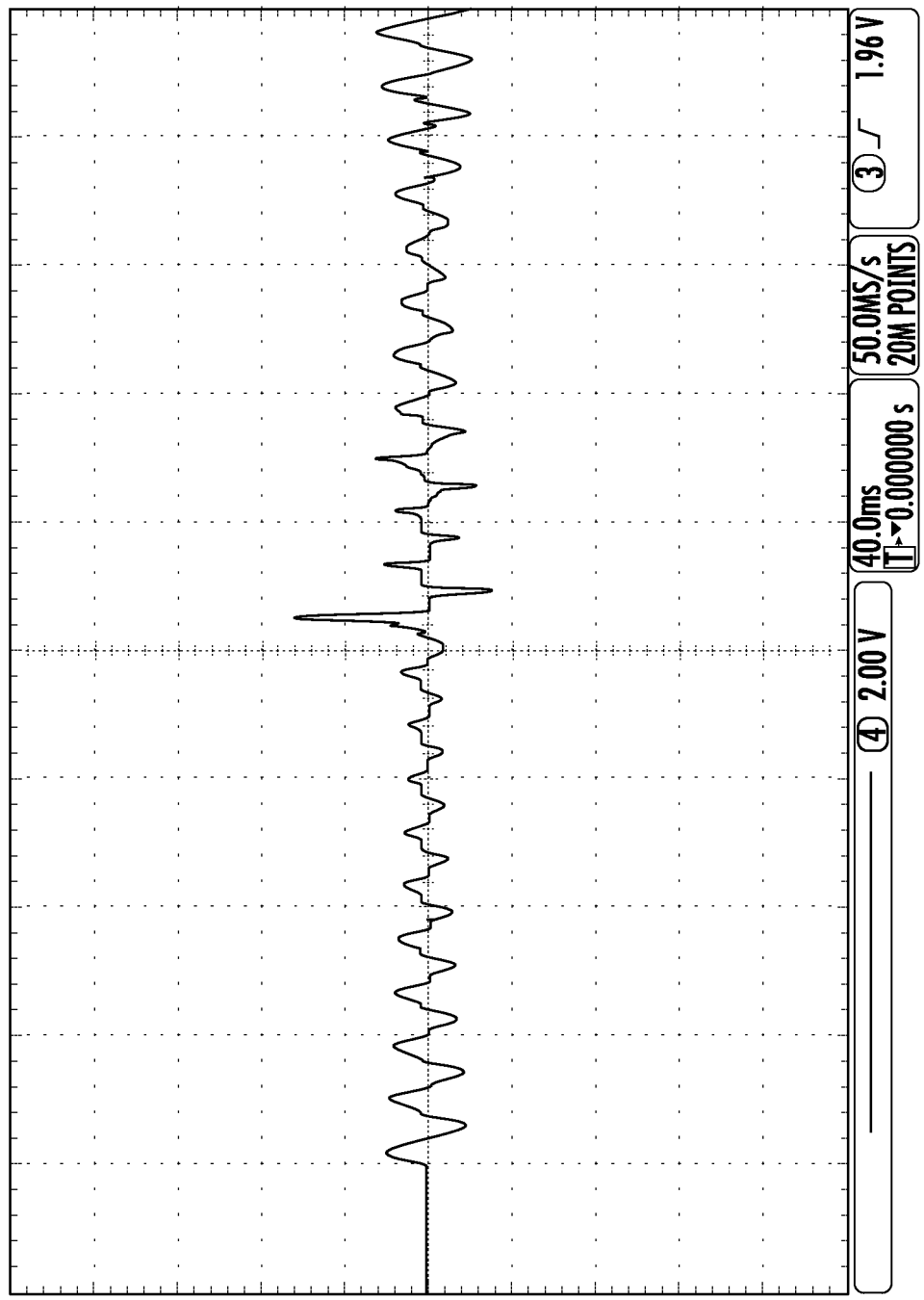
FIG. 13 is an image of an oscilloscope trace showing inrush current through an active inrush current limiter according to aspects of the disclosure connected between an AC source and five 500 watt power supplies.
Figure 14:
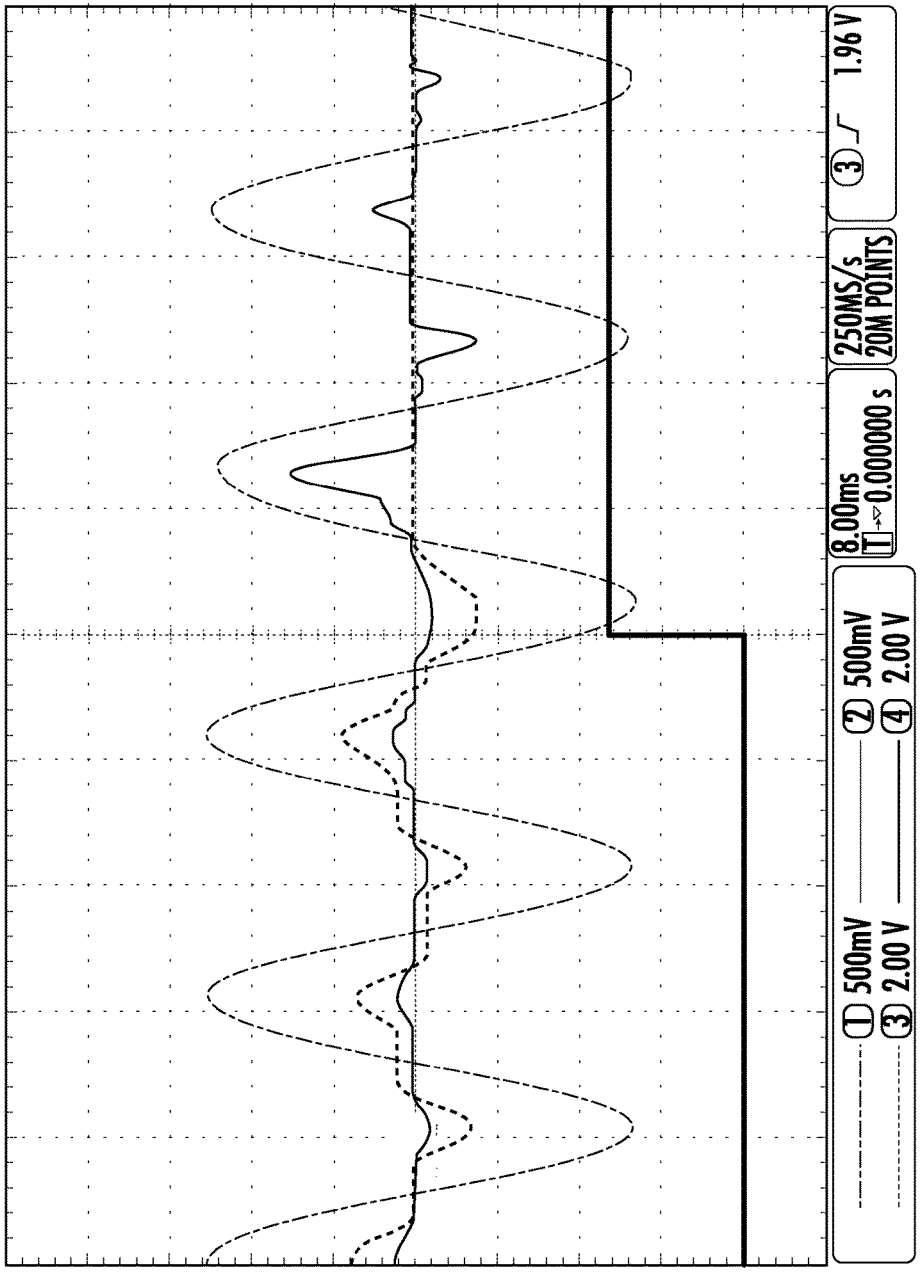
FIG. 14 shows oscilloscope traces corresponding to voltages, currents and control signals relevant to one disclosed embodiment of an active inrush current limiter and associated method of limiting inrush current connected between an AC source and five 500 watt power supplies on an expanded time scale centered on a bypass relay closure control signal generated by the active inrush current limiter.

FIG. 7 illustrates a large spike of inrush current drawn by five 500 watt power supplies connected to an AC power source without the disclosed active inrush current limiter 10. FIG. 13 illustrates AC current drawn by five 500 watt power supplies with an active inrush current limiter 10 connected between the AC power source and the power supplies. The inrush current is limited to a maximum value of 14 Amps, in contrast to the 92 Amps in the absence of the active inrush current limiter 10. FIG. 14 is a screen shot of an oscilloscope connected to display the AC input current, the voltage drop across the Triac U1 and current limiting resistor R3 (VDrop), the AC input voltage, and the relay turn on signal RELAY_ON with an expanded time scale to show the relationship between these variables for two cycles of AC power before and after the RELAY_ON signal is generated. FIG. 14 shows that the relationship between VLine (AC input voltage) and VDrop (voltage drop after thermistors) changes during the last cycle of AC power before the RELAY_ON signal is generated. With the AC line voltage constant, VDrop stops declining and starts to increase, meaning that VDiff stops increasing and starts to decrease. This indicates that the capacitors in the power supplies have completed charging and the power supplies are starting to draw operating current. In this case, the active inrush current limiter 10 detected the decrease in VDiff during the last two half cycles of AC line voltage, which satisfied test (ii) of step 116 in the INRUSH SETTLING state. With VLine constant the test for increasing line voltage at (ii)(a) is true and the Healthy Voltage check in test (ii)(b) is also true, so the program generates the RELAY_ON signal and enters the MONITOR state. FIG. 14 also illustrates that the RELAY_ON signal is generated in advance of a zero cross and the relay contacts close near the zero cross, as indicated by VDrop (voltage drop after thermistors) falling to zero. Finally, there is a secondary inrush of AC input current after closure of the relay contacts, indicating that the active inrush current limiter could benefit from the second current limiting resistor R2 and electronic switch U2 of the active inrush current limiter of FIG. 5 when connected to three or more power supplies.

Figure 15:
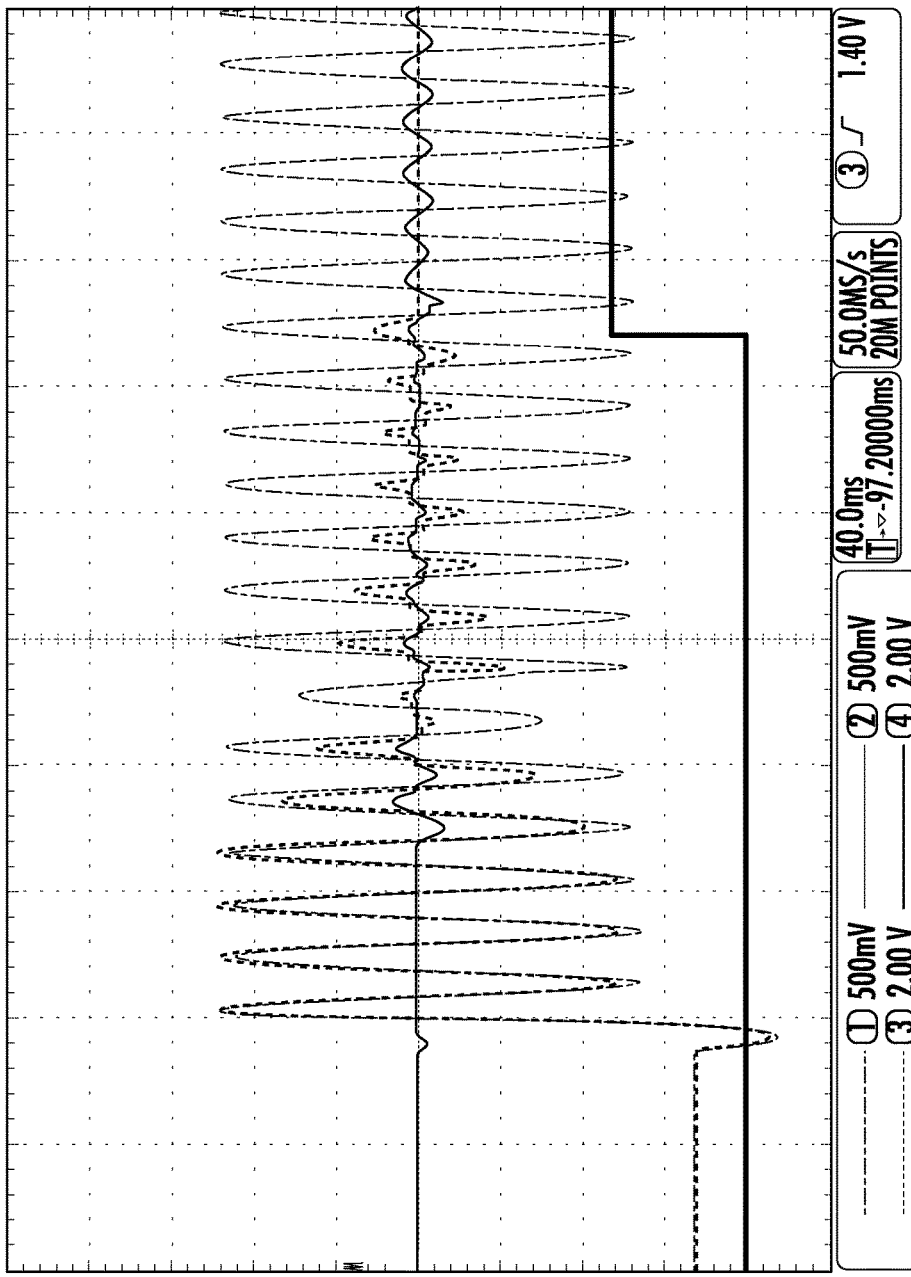
FIG. 15 shows oscilloscope traces corresponding to voltages, currents and control signals relevant to one disclosed embodiment of an active inrush current limiter and associated method of limiting inrush current where the AC line voltage falls (dips) for a short time during active inrush current limiting according to aspects of the disclosure.

FIG. 15 illustrates how an active inrush current limiter 10 responds to a drop in AC input voltage (VLine) from 250V to 150V for 20 ms while the active inrush current limiter is limiting inrush current. The sudden drop in AC line voltage (VLine) might trigger a false positive response to test (i) of step 116 of FIG. 9 because the capacitors stop drawing current and VDiff becomes very large relative to VLine. The second "Healthy Voltage check" test (i)(a) fails because VLine(n) [150V] is not greater than 87.5% of the Healthy Voltage [87.5% of 250V=218.75] determined at step 108(*b*) of FIG. 8. FIG. 15 shows that in the half cycle of AC power following the voltage dip, VDrop increases relative to the previous half cycle, which could trigger a false outcome for test (ii) of step 116 in FIG. 9, e.g., VDiff(n)<VDiff(n−1). However, the next step of test (ii) would fail because VLine(n−1) [150V] is not greater than 87.5% of VLine(n) [87.5% of 250V=218.75]. The "Healthy Voltage" check at (ii)(b) would also fail. FIG. 15 shows that the active inrush current limiter ignores the decrease and voltage increase of the voltage dip and waits for a decrease in VDiff when the AC line voltage is stable to close the relay S1.

Figure 16:
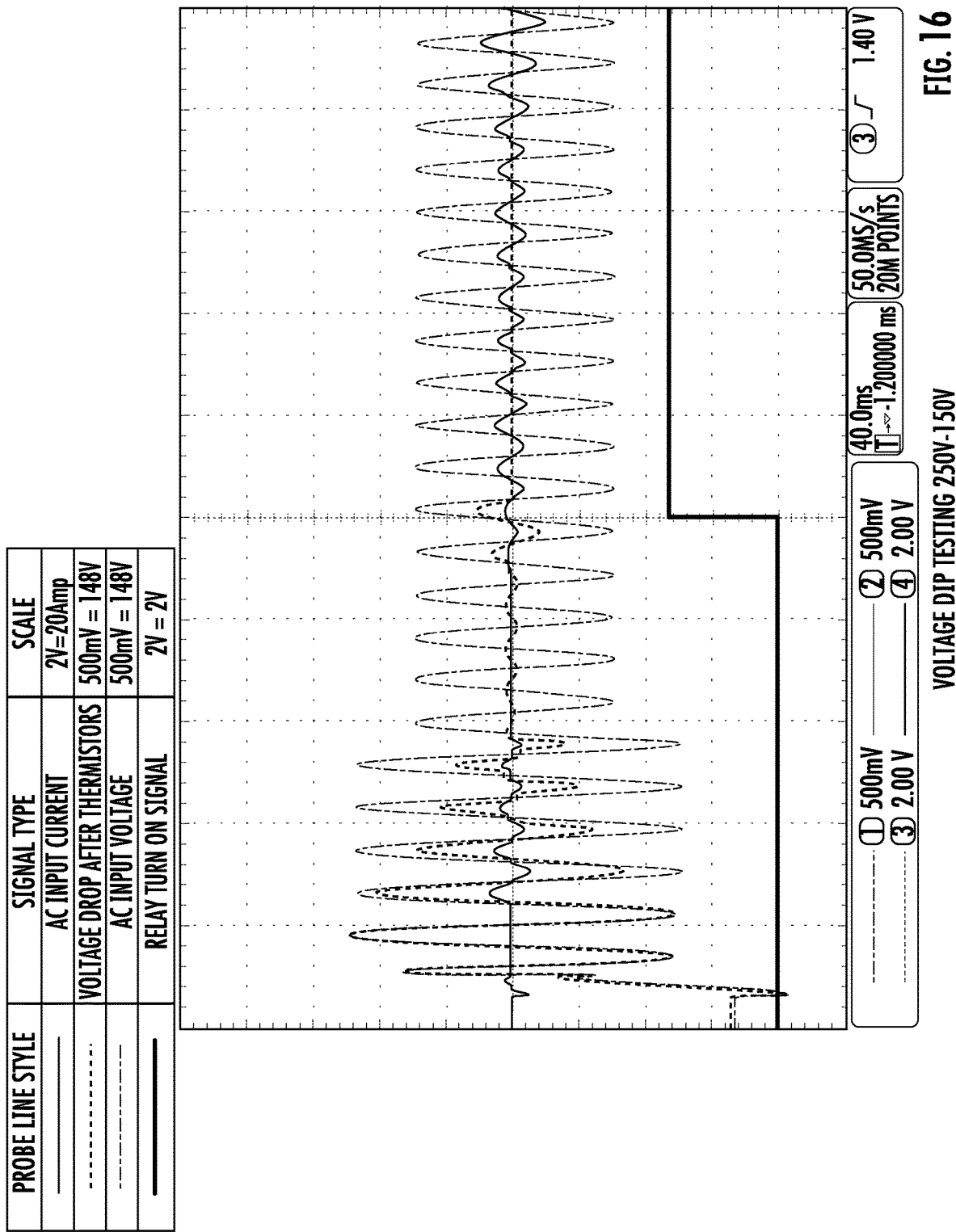
FIG. 16 shows oscilloscope traces corresponding to voltages, currents and control signals relevant to one disclosed embodiment of an active inrush current limiter and associated method of limiting inrush current where the AC line voltage falls and remains low during active inrush current limiting according to aspects of the disclosure.

FIG. 16 illustrates how an active inrush current limiter 10 responds to a drop in AC line voltage from 250V to 150V, where the AC line voltage remains at 150V while inrush current is being limited. The active inrush current limiter ignores the decrease in voltage that might trigger a false positive response to test (i) of step 116 of FIG. 9, because the "Healthy Voltage" check step fails [VLine(n)=150V] is not greater than [87.5% of 250V=218.75]. A false positive for test (ii) of step 116 is also avoided due to failure of the Healthy Voltage check at (ii)(b) of step 116. FIG. 16 shows that the active inrush current limiter waits for a fall in VDiff with a stable AC line voltage before generating the RELAY_ON signal. With a stable line voltage test (ii)(a) is true and after several AC power cycles at 150V, step 106 of FIG. 8 has updated the Healthy Voltage to be 150V and the Healthy Voltage check at (ii)(b) will also be true.

Figure 17:
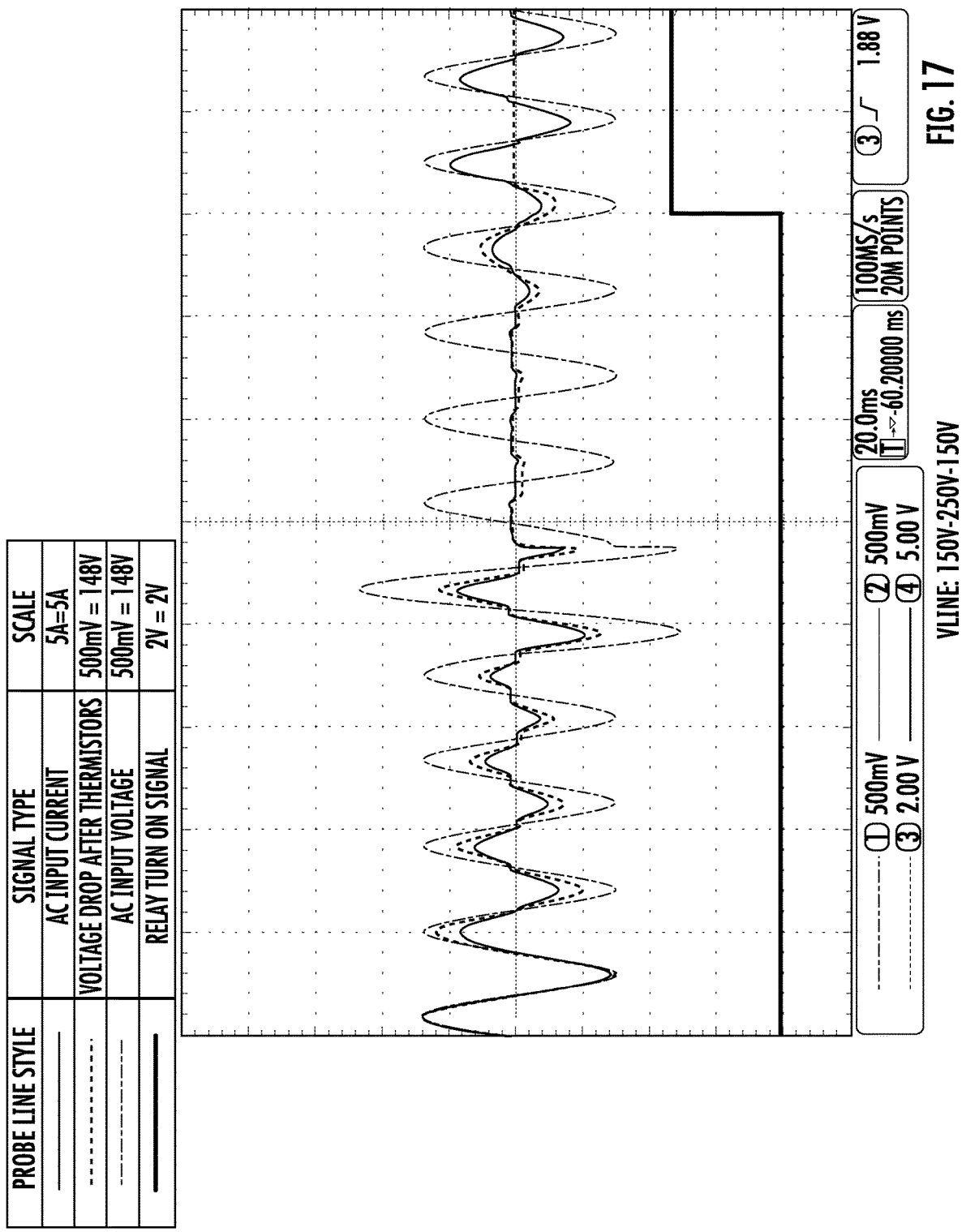
FIG. 17 shows oscilloscope traces corresponding to voltages, currents and control signals relevant to one disclosed embodiment of an active inrush current limiter and associated method of limiting inrush current where the AC line voltage rises for a short time during active inrush current limiting according to aspects of the disclosure.

FIG. 17 illustrates how an active inrush current limiter 10 responds to a short duration increase in AC line voltage from 150V to 250V for 20 ms while inrush current is being limited. The active inrush current limiter ignores both the leading edge (rise) and trailing edge (fall) of the voltage increase and waits for a decrease in VDiff when the AC line voltage is stable to generate the RELAY_ON signal. The Healthy Voltage check at (i)(a) and (ii)(b) of step 116 prevent false positive outcomes that might be triggered by the leading or trailing edges of the short duration voltage increase (spike).

Figure 18:
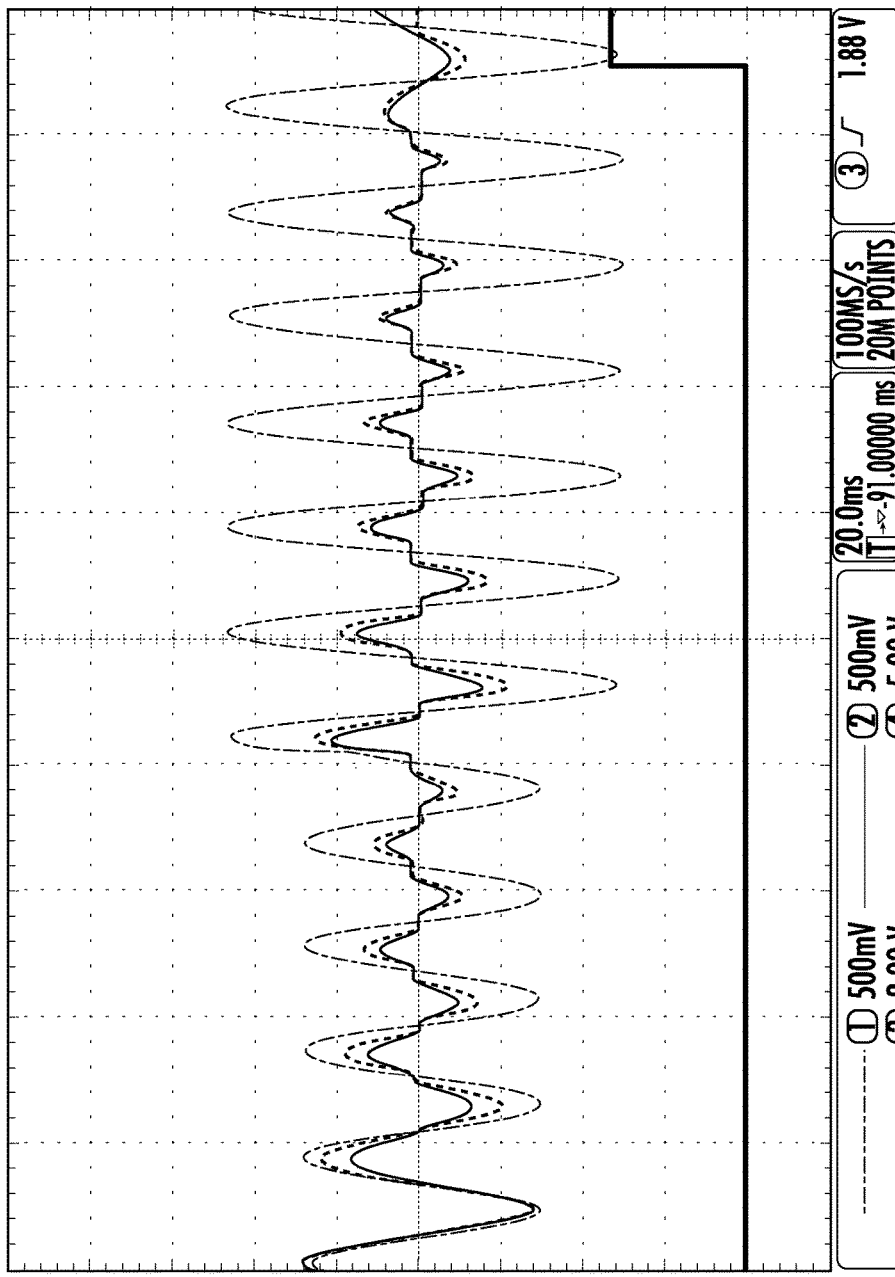
FIG. 18 shows oscilloscope traces corresponding to voltages, currents and control signals relevant to one disclosed embodiment of an active inrush current limiter and associated method of limiting inrush current where the AC line voltage rises and remains high during active inrush current limiting according to aspects of the disclosure.

FIG. 18 illustrates how an active inrush current limiter 10 responds to an increase in AC line voltage from 150V to 250V while inrush current is being limited where the increased AC line voltage continues indefinitely. A sudden increase in AC line voltage (VLine) can produce a false positive result for test (ii) of step 116, because of an decrease in VDiff for the last half cycle at 150V compared to VDiff for the first half cycle at 250V. Test (ii)(a) looking for a large increase in VLine will fail because Vline(n−1) [150V] is not greater than 87.5% of VLine(n) [218.75V]. The active inrush current limiter 10 ignores the increase in AC line voltage and waits for a decrease in VDiff that satisfies test (ii) of step 116 when the AC line voltage is stable, so that parts (ii)(a) and (ii)(b) are also true before generating the RELAY_ON signal.

Figure 19:
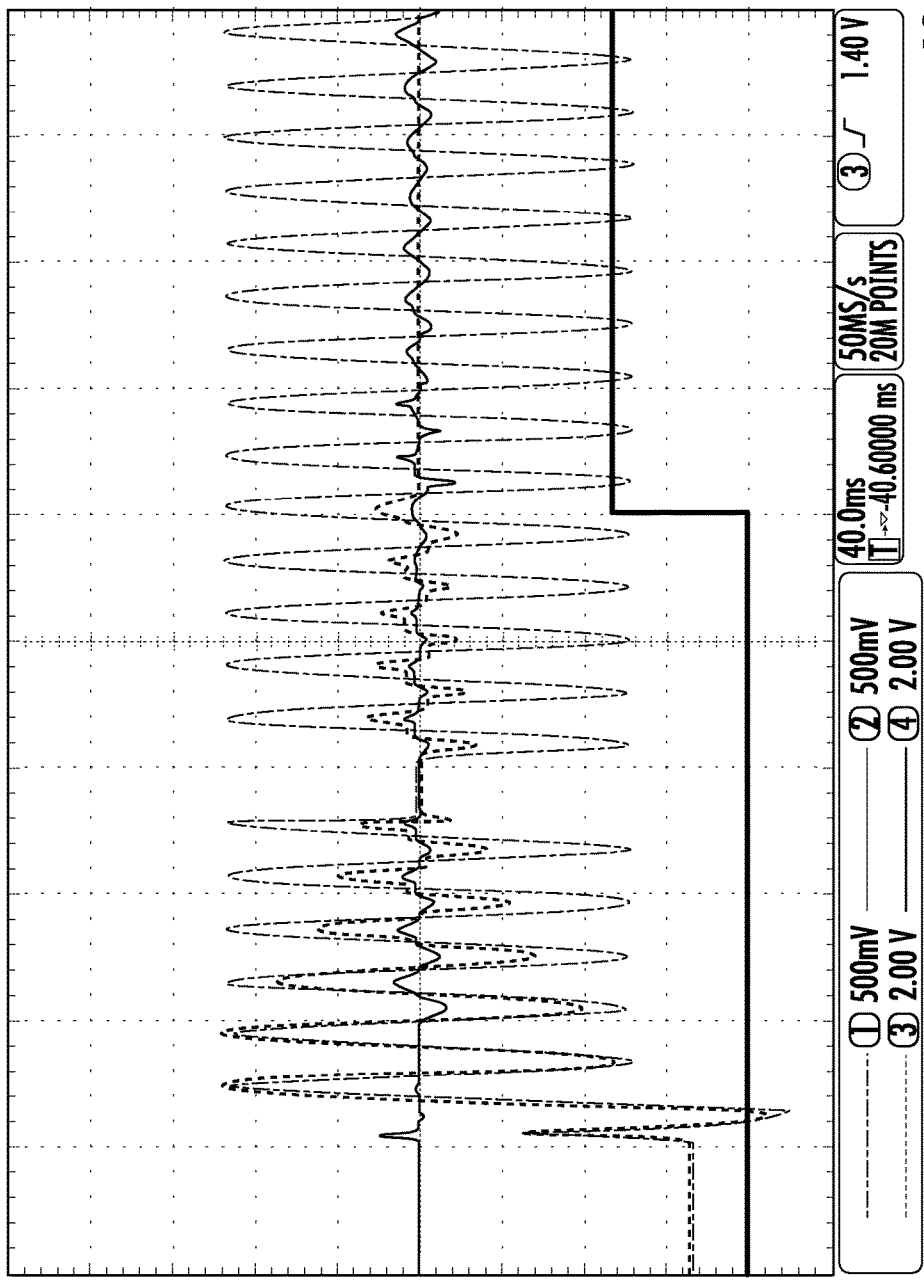
FIG. 19 shows oscilloscope traces corresponding to voltages, currents and control signals relevant to one disclosed embodiment of an active inrush current limiter and associated method of limiting inrush current where the AC line voltage is interrupted for a short time during active inrush current limiting according to aspects of the disclosure.

FIG. 19 illustrates how an active inrush current limiter according to the disclosure responds to a loss of AC line voltage for 20 ms while inrush current is being limited. As discussed above with respect to FIG. 15, the loss of AC line voltage produces a sudden drop in VLine, VDrop and VDiff that can result in a false outcome for test (i) of step 116, but the Healthy Voltage check (i)(a) will fail because VLine(n) [0V] is not greater than 87.5% of Healthy Voltage [218.75]. The sudden rise in AC line voltage when power is restored may result in a false outcome of test (ii) of step 116, but test (ii)(a) looking for a large increase in VLine will fail because Vline(n−1) [0V] is not greater than 87.5% of VLine(n) [218.75V]. The active inrush current limiter 10 ignores the loss of AC line voltage and the increase in AC line voltage when power is restored and waits for a decrease in VDiff that satisfies test (ii) of step 116 when the AC line voltage is stable, so that tests (ii)(a) and (ii)(b) are also true before generating the RELAY_ON signal.

Figure 20:
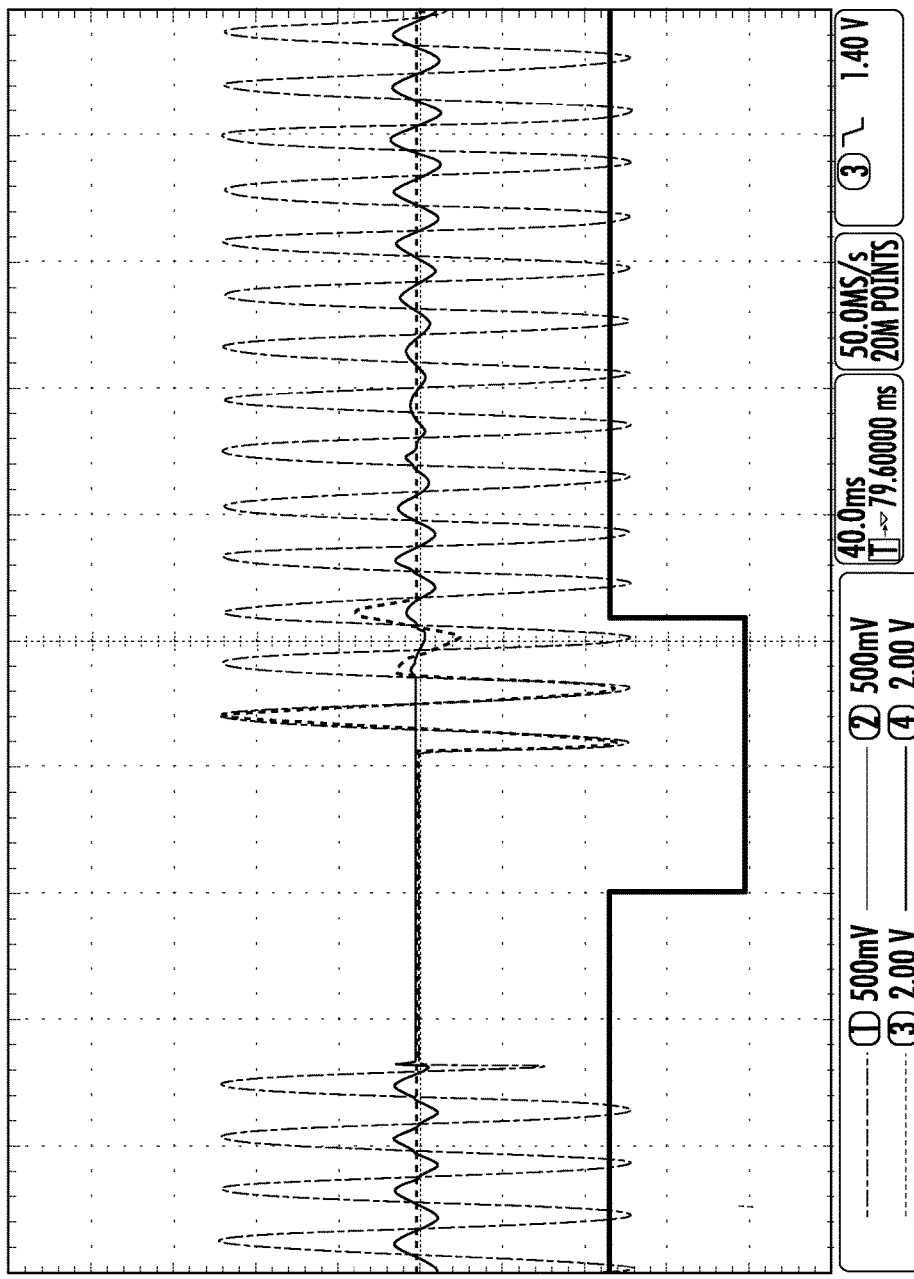
FIG. 20 shows oscilloscope traces corresponding to voltages, currents and control signals relevant to one disclosed embodiment of an active inrush current limiter and associated method of limiting inrush current where the AC line voltage is interrupted and restored after active inrush current limiting according to aspects of the disclosure.

FIG. 20 illustrates how an active inrush current limiter according to the disclosure responds to a loss of AC line voltage for a period of 100 ms during normal operation. Normal operation is after inrush current has been limited, the relay S1 has been closed, Triac U1 is turned off, and the program is in the MONITOR state at step 122. With reference to FIG. 9 step 122, in the MONITOR state the program monitors VLine to see if the AC line voltage falls below a threshold. In the MONITOR state, the program also looks for zero crossings detected in the background routine of FIG. 8 at step 106. If either the AC line voltage falls below the threshold or no zero crossings are detected for a predetermined period, then the program enters a FAILURE state, opens the relay at step 124 and returns to the STARTUP state where inrush current is limited. This protects the AC source from inrush current that would result when power is restored after a loss of AC power during normal operation if the relay S1 were not opened. FIG. 20 shows that the active inrush current limiter 10 opens the relay S1 by turning off the RELAY_ON signal about 60 ms after power is lost. The active inrush current limiter then begins the program again at step 110 in the STARTUP state and waits for one of the tests of step 116 in the INRUSH SETTLING state to be satisfied before turning on the RELAY_ON signal to again close the relay. FIG. 20 shows that any inrush current is effectively limited when the relay S1 is closed and the system returns to normal operation.

Figure 21:
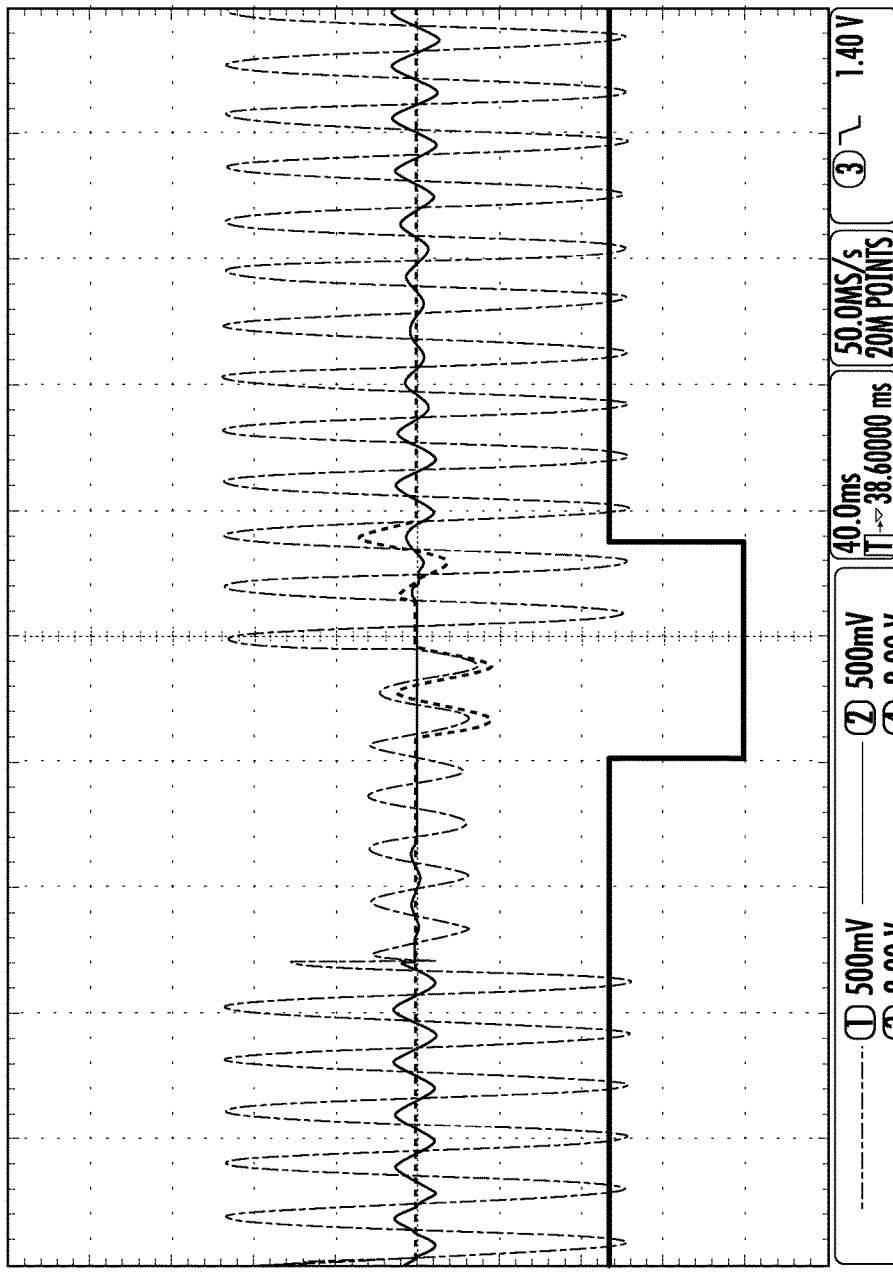
FIG. 21 shows oscilloscope traces corresponding to voltages, currents and control signals relevant to one disclosed embodiment of an active inrush current limiter and associated method of limiting inrush current where the AC line voltage is reduced and restored after inrush current limiting according to aspects of the disclosure.

FIG. 21 illustrates how an active inrush current limiter according to the disclosure responds to a reduction of AC line voltage from 250V to 60V for a period of 100 ms during normal operation. Normal operation is after inrush current has been limited, the relay S1 has been closed, the Triac U1 has been opened and the program is in the MONITOR state at step 122. With reference to FIG. 9 step 122, in the MONITOR state the program monitors VLine to see if the AC line voltage falls below a threshold. In the MONITOR state, the program also looks for zero crossings detected in the background routine of FIG. 8 at step 106. If either the AC line voltage falls below the threshold or no zero crossings are detected for a predetermined period, then the program enters a FAILURE state, opens the relay at step 124 and returns to the STARTUP state where inrush current is limited. This protects the AC source from inrush current that would result when power is restored after a period of very low AC line voltage if the relay S1 were not opened. FIG. 20 shows that the active inrush current limiter 10 opens the relay S1 by turning off the RELAY_ON signal about 60 ms after power is reduced below the threshold, even though zero crossings would be detected. The active inrush current limiter then begins the program again at step 110 in the STARTUP state and waits for one of the tests of step 116 in the INRUSH SETTLING state to be satisfied before turning on the RELAY_ON signal to again close the relay. FIG. 21 shows that any inrush current is effectively limited when the relay S1 is closed and the system returns to normal operation.

What is claimed:

1. A method of limiting inrush current in a module arranged between an ON/OFF switching device and equipment receiving AC power from the ON/OFF switching device, said method comprising:
   closing an electronic switch to connect the AC power to a capacitive load through a current limiting resistance;
   connecting a relay contact in parallel with the electronic switch and current limiting resistance so that closure of the relay contact connects the AC power directly to the capacitive load, bypassing the current limiting resistance;
   taking a plurality of voltage measurements of the AC power for a half-cycle of the AC power;
   summing the plurality of voltage measurements of the AC power to generate VLine(n);
   taking a plurality of voltage measurements across the current limiting resistance for the half cycle of the AC power;
   summing the plurality of voltage measurements across the current limiting resistance to generate VDrop(n);
   subtracting VDrop(n) from VLine(n) to generate VDiff(n);
   closing the relay contact to bypass the current limiting resistance if:
   i. VDiff(n)≥a predetermined percentage of VLine(n); or
   ii. VDiff(n)<VDiff(n−1); or
   iii. a pre-determined time X has elapsed;
      wherein n represents a present half cycle of said AC power and n−1 represents a previous half cycle of said AC power.

2. The method of claim 1, wherein the predetermined percentage of VLine(n) is between 80% and 95%.

3. The method of claim 1, wherein said current limiting resistance is a thermistor having a negative coefficient of resistance (NTC).

4. The method of claim 1, wherein said step of taking a plurality of voltage measurements of the AC power and said step of taking said plurality of voltage measurements across said current limiting resistance comprise taking said plurality of voltage measurements at the same regular intervals.

5. The method of claim 4 comprising detecting zero crosses of the AC power, defining a half cycle of AC power between zero crosses, counting the number of regular intervals between zero crosses and rejecting a plurality of voltage measurements where the number of regular intervals represents a frequency outside of a defined range of frequencies.

6. The method of claim 5 wherein the defined range of frequencies is 45 Hz to 71 Hz.

7. The method of claim 1 comprising;
   connecting a second current limiting resistance and second electronic switch in series between said AC power and said equipment, where the second current limiting resistance and second electronic switch are in parallel with said electronic switch and said current limiting resistance.

8. The method of claim 1 comprising opening said electronic switch after closing the relay contact.

9. The method of claim 1 comprising monitoring the AC power by comparing an average of the plurality of voltage measurements of the AC power for each half cycle of the AC power with a predetermined threshold voltage and opening said relay contacts if said average of the plurality of voltage measurements of the AC power falls below said predetermined threshold for a specified time and close said electronic switch to apply AC power to the load through said current limiting resistor until conditions i. ii. or iii. are met.

10. An inrush current limiter for connection between a source of alternating current (AC) power and a load, said inrush current limiter comprising:
   an electronic switch in series with a current limiting resistor, said electronic switch and current limiting resistor arranged to apply said AC power to said load through said current limiting resistor when said electronic switch is closed;
   a relay with contacts parallel with said electronic switch and current limiting resistor, said contacts when closed connect said AC power to said load, bypassing said electronic switch and current limiting resistor;
   a microcontroller connected to control said electronic switch and said relay and arranged to measure a voltage (VLine) of said AC power and a voltage drop (VDrop) across said current limiting resistor when said electronic switch is closed, said microcontroller programmed to:
   sample VLine at a plurality of intervals over each half cycle of said AC power and sum the samples of VLine for each half cycle of said AC power to generate VLine(n);
   sample VDrop at a plurality of intervals over each half cycle of said AC power and sum the samples of VDrop for each half cycle of said AC power to generate VDrop(n);
   subtract VDrop(n) from VLine(n) to generate VDiff(n) for each half cycle of said AC power;
   said microcontroller programmed to close the relay contact to bypass the current limiting resistance if:
   i. VDiff(n)≥a predetermined percentage of VLine(n); or
   ii. VDiff(n)<VDiff(n−1); or
   iii. a pre-determined time X has elapsed;
      wherein n represents a present half cycle of said AC power and n−1 represents a previous half cycle of said AC power.

11. The inrush current limiter of claim 10 wherein said microcontroller is programmed to
   monitor VLine to detect an increase or decrease in VLine; and
   in the event of a decrease in VLine greater than a second predetermined percentage of VLine, to ignore a positive result of calculation i; and
   in the event of an increase or decrease in VLine greater than a third predetermined percentage of VLine, to ignore a positive result of calculation ii.

12. The inrush current limiter of claim 11, wherein said third predetermined percentage is 10%.

13. The inrush current limiter of claim 10, wherein said predetermined percentage of VLine is between 80% and 95%.

14. The inrush current limiter of claim 10 comprising;
   a second current limiting resistance and second electronic switch connected in series between said AC power and said equipment, where the second current limiting resistance and second electronic switch are in parallel with said electronic switch and said current limiting resistance,
   wherein said microcontroller is programmed to close said second electronic switch after closure of said first electronic switch and before closure of said relay.

15. The inrush current limiter of claim 10, wherein said microcontroller is programmed to compare an average of VLine for each half cycle with a predetermined threshold voltage and open said relay contacts if said average of VLine falls below said predetermined threshold for a specified time, and close said electronic switch to apply AC power to the load through said current limiting resistor until conditions i. ii. or iii. are met.

16. The inrush current limiter of claim 10, wherein said samples of VLine and VDrop are taken simultaneously at the same plurality of regular intervals.

17. The inrush current limiter of claim 10, wherein said current limiting resistor is a thermistor having a negative coefficient of resistance (NTC).

18. The inrush current limiter of claim 10, wherein said electronic switch is a Triac configured to close at a zero cross of said AC power.

19. The inrush current limiter of claim 10, wherein said relay is an electromechanical relay and said microcontroller is programmed to generate a signal to close the relay contact a predetermined period of time before a zero cross of the AC power following satisfaction of conditions i. ii. or iii.

\* \* \* \* \*